United States Patent
Ezure et al.

(10) Patent No.: US 8,767,627 B2
(45) Date of Patent: Jul. 1, 2014

(54) PATH CONTROL METHOD FOR MULTIHOP WIRELESS NETWORK

(75) Inventors: Yuichiro Ezure, Tokyo (JP); Kenichi Abe, Tokyo (JP); Toru Yamamoto, Tokyo (JP); Atsushi Fujimura, Tokyo (JP)

(73) Assignee: NEC Corporation, Tokyo (JP)

( * ) Notice: Subject to any disclaimer, the term of this patent is extended or adjusted under 35 U.S.C. 154(b) by 49 days.

(21) Appl. No.: 13/536,792

(22) Filed: Jun. 28, 2012

(65) Prior Publication Data

US 2013/0070671 A1   Mar. 21, 2013

(30) Foreign Application Priority Data

Sep. 15, 2011   (JP) .................................. 2011-202237

(51) Int. Cl.
*H04W 40/00* (2009.01)
(52) U.S. Cl.
USPC .......................................................... 370/328
(58) Field of Classification Search
USPC ........................... 370/254–350; 709/201–213
See application file for complete search history.

(56) References Cited

U.S. PATENT DOCUMENTS 8,547,895 B2 * 10/2013 Chun et al. .................... 370/315
2010/0195551 A1 * 8/2010 Kuwana ........................ 370/311

FOREIGN PATENT DOCUMENTS

JP   2010/166150 A   7/2010

* cited by examiner

*Primary Examiner* — Ayaz Sheikh
*Assistant Examiner* — Debebe Asefa
(74) *Attorney, Agent, or Firm* — McGinn IP Law Group, PLLC

(57) ABSTRACT

A multihop wireless network includes a plurality of wireless nodes. Each wireless node calculates a metric value indicating a quantity of providing a guideline for selecting a superordinate destination node with each candidate for the superordinate destination node when carrying out a multihop wireless communication with a specific wireless node based on peripheral node information about node information received from the peripheral wireless nodes and determines the superordinate destination node based on the calculated metric value. The network system selects a superordinate wireless node as a target wireless node expected to change the number of the wireless nodes existing in a subordinate hierarchy, and intentionally changes a value of the node information sent from the target wireless node to the peripheral wireless nodes.

20 Claims, 17 Drawing Sheets

FIG. 8

| NODE IDENTIFIER | HOP NUMBER | SUPERORDINATE DESTINATION NODE | METRIC VALUE | CHILD NODE NUMBER | CHANGE FLAG | CHANGE VALUE |
|---|---|---|---|---|---|---|
| 201 | 0 | 0 | 0 | 2 | 0 | — |
| 202 | 1 | 201 | 2.0 | 2 | 0 | — |
| 203 | 1 | 201 | 3.0 | 2 | 0 | — |
| 204 | 2 | 202 | 4.0 | 1 | 0 | — |
| 205 | 2 | 202 | 5.0 | 0 | 0 | — |
| 206 | 2 | 203 | 4.0 | 3 | 0 | — |
| 207 | 2 | 203 | 4.0 | 0 | 0 | — |
| 208 | 3 | 204 | 6.0 | 0 | 0 | — |
| 209 | 3 | 206 | 5.0 | 0 | 0 | — |
| 210 | 3 | 206 | 5.0 | 0 | 0 | — |
| 211 | 3 | 206 | 5.0 | 0 | 0 | — |

FIG. 11

| NODE IDENTIFIER | HOP NUMBER | SUPERORDINATE DESTINATION NODE | METRIC VALUE | ATTRIBUTIVE SINK NODE | CHANGE FLAG | CHANGE VALUE |
|---|---|---|---|---|---|---|
| 1000 | 0 | 0 | 0 | 1000 | 0 | — |
| 1001 | 1 | 1000 | 2.0 | 1000 | 0 | — |
| 1002 | 1 | 1000 | 2.0 | 1000 | 0 | — |
| 1003 | 2 | 1001 | 4.0 | 1000 | 0 | — |
| 1004 | 2 | 1001 | 4.0 | 1000 | 0 | — |
| 1005 | 2 | 1002 | 4.0 | 1000 | 0 | — |
| 1006 | 2 | 1002 | 4.0 | 1000 | 0 | — |
| 1007 | 3 | 1015 | 4.0 | 1021 | 0 | — |
| 1008 | 3 | 1015 | 4.0 | 1021 | 0 | — |
| 1009 | 3 | 1015 | 4.0 | 1021 | 0 | — |
| 1010 | 3 | 1017 | 4.0 | 1021 | 0 | — |
| 1011 | 3 | 1017 | 4.0 | 1021 | 0 | — |
| 1012 | 3 | 1017 | 4.0 | 1021 | 0 | — |
| 1013 | 3 | 1015 | 4.0 | 1021 | 0 | — |
| 1014 | 2 | 1019 | 3.0 | 1021 | 0 | — |
| 1015 | 2 | 1020 | 3.0 | 1021 | 0 | — |
| 1016 | 2 | 1020 | 3.0 | 1021 | 0 | — |
| 1017 | 2 | 1019 | 3.0 | 1021 | 0 | — |
| 1018 | 2 | 1021 | 2.0 | 1021 | 0 | — |
| 1019 | 1 | 1021 | 2.0 | 1021 | 0 | — |
| 1020 | 1 | 1021 | 2.0 | 1021 | 0 | — |
| 1021 | 0 | 0 | 0 | 1021 | 0 | — |

FIG. 12

| NODE IDENTIFIER | HOP NUMBER | SUPERORDINATE DESTINATION NODE | METRIC VALUE | ATTRIBUTIVE SINK NODE | CHANGE FLAG | CHANGE VALUE |
|---|---|---|---|---|---|---|
| 1000 | 0 | 0 | 0 | 1000 | 0 | — |
| 1001 | 1 | 1000 | 2.0 | 1000 | 0 | — |
| 1002 | 1 | 1000 | 2.0 | 1000 | 0 | — |
| 1003 | 2 | 1001 | 4.0 | 1000 | 0 | — |
| 1004 | 2 | 1001 | 4.0 | 1000 | 0 | — |
| 1005 | 2 | 1002 | 4.0 | 1000 | 0 | — |
| 1006 | 2 | 1002 | 4.0 | 1000 | 0 | — |
| 1007 | 2 | 1002 | 4.0 | 1000 | 0 | — |
| 1008 | 3 | 1015 | 6.0 | 1021 | 0 | — |
| 1009 | 3 | 1003 | 5.0 | 1000 | 0 | — |
| 1010 | 3 | 1003 | 5.0 | 1000 | 0 | — |
| 1011 | 3 | 1004 | 5.0 | 1000 | 0 | — |
| 1012 | 3 | 1017 | 6.0 | 1021 | 0 | — |
| 1013 | 3 | 1017 | 6.0 | 1021 | 0 | — |
| 1014 | 3 | 1015 | 6.0 | 1021 | 0 | — |
| 1015 | 2 | 1019 | 5.0 | 1021 | 0 | — |
| 1016 | 2 | 1020 | 5.0 | 1021 | 0 | — |
| 1017 | 2 | 1020 | 5.0 | 1021 | 0 | — |
| 1018 | 2 | 1019 | 5.0 | 1021 | 0 | — |
| 1019 | 1 | 1021 | 2.0 | 1021 | 0 | — |
| 1020 | 1 | 1021 | 2.0 | 1021 | 0 | — |
| 1021 | 0 | 0 | 0 | 1021 | 1 | 1 |

PATH CONTROL METHOD FOR MULTIHOP WIRELESS NETWORK

INCORPORATION BY REFERENCE

The present application claims priority from Japanese Patent Application No. 2011-202237, filed on Sep. 15, 2011 in Japan, the disclosure of which is incorporated herein by reference in its entirety.

TECHNICAL FIELD

The present invention relates to a network system composed of a plurality of wireless nodes for carrying out multihop wireless communications with specific wireless nodes, and to a path control method therefor.

BACKGROUND ART

There are wireless sensor network systems as the above type of network systems. In a wireless sensor network system, on generating a path with a sink node as the destination and a sensor node as the source by applying a routing protocol suitable for wireless multihop networks such as OLSR (Optimized Link State Routing), AODV (Ad hoc On-Demand Distance Vector), and the like, as a result, a network topology of tree structure (to be referred to as tree topology hereinbelow) is constructed with a sink node as the apex and sensor nodes positioned at the portions of knots and leaves. In this case, however, bias may occur in the number of child nodes among a plurality of nodes of the same hierarchy. Since such kind of bias causes an increase of load on specific nodes, it is necessary to remove it as far as possible.

The following Patent Document 1 discloses an example of the path control method for removing such bias occurring in the tree topology as described above. In this technique, if a specific device (the network construction device 30 in FIG. 1 of the Patent Document 1) detects that a bias is occurring in the generated tree topology, in order to remove the bias, the system analyzes between which nodes connection should be changed, and carries out connection change after sending a message to each of the nodes as the objects of connection change.

[Patent Document 1] JP 2010-166150 A

However, in the method for carrying out connection change after sending a message to each node of a connection change object, it is necessary to interchange messages of transmission and response in proportion to the node number of the connection change objects.

SUMMARY

An exemplary object of the present invention is to provide a path control method for multihop wireless networks, a multihop wireless network, and wireless nodes to solve the above problem, that is, a considerable communication cost is needed for improvement in removing the bias of tree topology in multihop wireless network systems.

In order to solve the above problem, an aspect in accordance with the present invention provides a path control method for multihop wireless network composed of a plurality of wireless nodes, the method including: calculating a metric value indicating a quantity of providing a guideline for selecting a superordinate destination node with each candidate for the superordinate destination node when carrying out a multihop wireless communication with a specific wireless node among the plurality of wireless nodes based on peripheral node information about the node information received from peripheral wireless nodes, by each of the wireless nodes; determining the superordinate destination node based on the calculated metric value, by each of the wireless nodes; selecting, as a target wireless node, the wireless node expected to change the number of the wireless nodes existing in a subordinate hierarchy lower than its own node from a network topology of tree structure with the specific wireless node as the root and other wireless nodes than the specific wireless node as the knots and leaves in the multihop wireless network; and changing, intentionally, a value of the node information sent from the target wireless node to the peripheral wireless nodes.

Further, another aspect in accordance with the present invention provides a multihop wireless network including: a plurality of wireless nodes; and a control node, wherein each of the wireless nodes includes: a peripheral node information acquisition unit for sending node information about its own wireless node to the peripheral wireless nodes while acquiring peripheral node information about the node information received from the peripheral wireless nodes, a metric calculation unit for calculating a metric value indicating a quantity of providing a guideline for selecting a superordinate destination node with each candidate for the superordinate destination node when carrying out a multihop wireless communication with a specific wireless node among the plurality of wireless nodes based on the acquired peripheral node information, and a superordinate destination node determination unit for determining the superordinate destination node based on the calculated metric value; and wherein the control node includes; a network management unit for generating a network topology of tree structure with the specific wireless node as the root and other wireless nodes than the specific wireless node as the knots and leaves in the multihop wireless network, selecting, as a target wireless node, the wireless node expected to change the number of the wireless nodes existing in a subordinate hierarchy lower than its own node from the generated network topology of tree structure, and changing, intentionally, a value of the node information sent from the target wireless node to the peripheral wireless nodes.

Further, still another aspect in accordance with the present invention provides a wireless node connected to a multihop wireless network, the wireless node including: a peripheral node information acquisition unit for sending node information about its own wireless node to peripheral wireless nodes while acquiring peripheral node information about the node information received from the peripheral wireless nodes; a metric calculation unit for calculating a metric value indicating a quantity of providing a guideline for selecting a superordinate destination node with each candidate for the superordinate destination node when carrying out a multihop wireless communication with a specific wireless node among the plurality of wireless nodes based on the acquired peripheral node information; a superordinate destination node determination unit for determining the superordinate destination node based on the calculated metric value; and a network management unit for generating a network topology of tree structure with the specific wireless node as the root and other wireless nodes than the specific wireless node as the knots and leaves in the multihop wireless network, selecting, as a target wireless node, the wireless node expected to change the number of the wireless nodes existing in a subordinate hierarchy lower than its own node from the generated network topology of tree structure, and changing, intentionally, a value of the node information sent from the target wireless node to the peripheral wireless nodes.

Because the present invention is configured in the above manner, it is possible to remove the bias of tree topology in the multihop wireless network system at a lower communication cost.

BRIEF DESCRIPTION OF DRAWINGS

FIG. 8 shows a configurational example of a network database possessed by the sink node of the wireless sensor network in accordance with the second exemplary embodiment of the present invention;

FIG. 11 shows an example of topology information (before correcting the bias) possessed by a topological database of the wireless sensor network in accordance with the third exemplary embodiment of the present invention;

FIG. 12 shows an example of topology information (after correcting the bias) possessed by the topological database of the wireless sensor network in accordance with the third exemplary embodiment of the present invention;

EXEMPLARY EMBODIMENTS

Hereinbelow, referring to the accompanying drawings, exemplary embodiments of the present invention will be explained in detail.

[A First Exemplary Embodiment]

Figure 14:
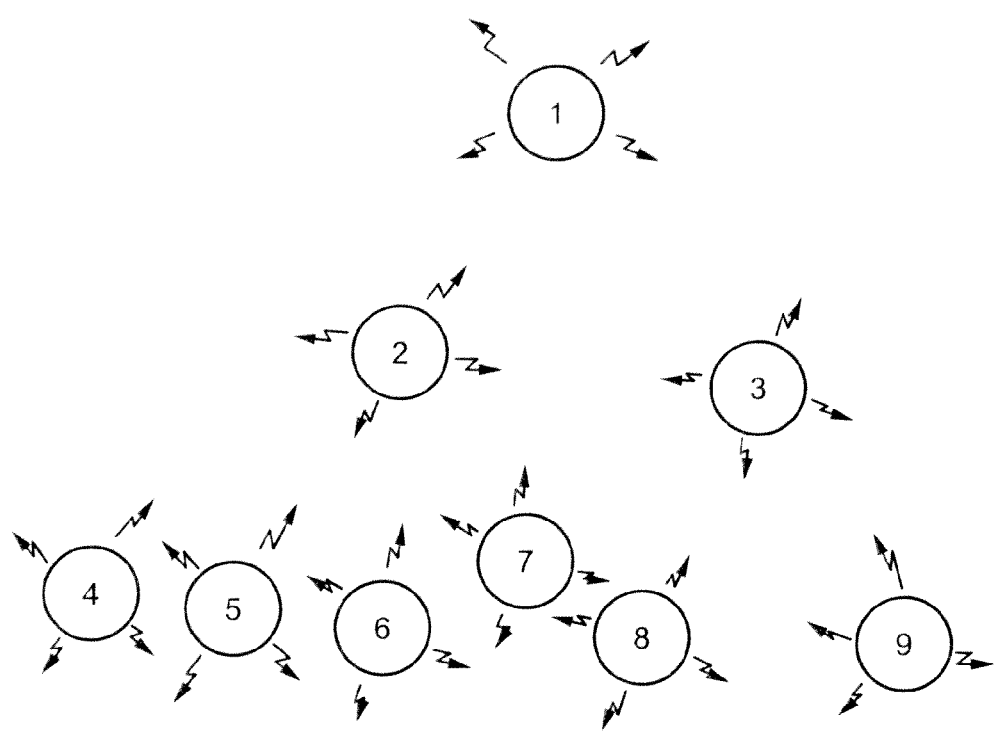
FIG. 14 shows an example of physical configuration of a multihop wireless network in accordance with a first exemplary embodiment of the present invention.

Referring to FIG. 14, a multihop wireless network system in accordance with a first exemplary embodiment of the present invention is composed of nine wireless nodes 1 to 9. It is for the explanatory convenience that the number of wireless nodes is taken to be nine. The present invention is applicable to an arbitrary number of wireless nodes.

Figure 15:
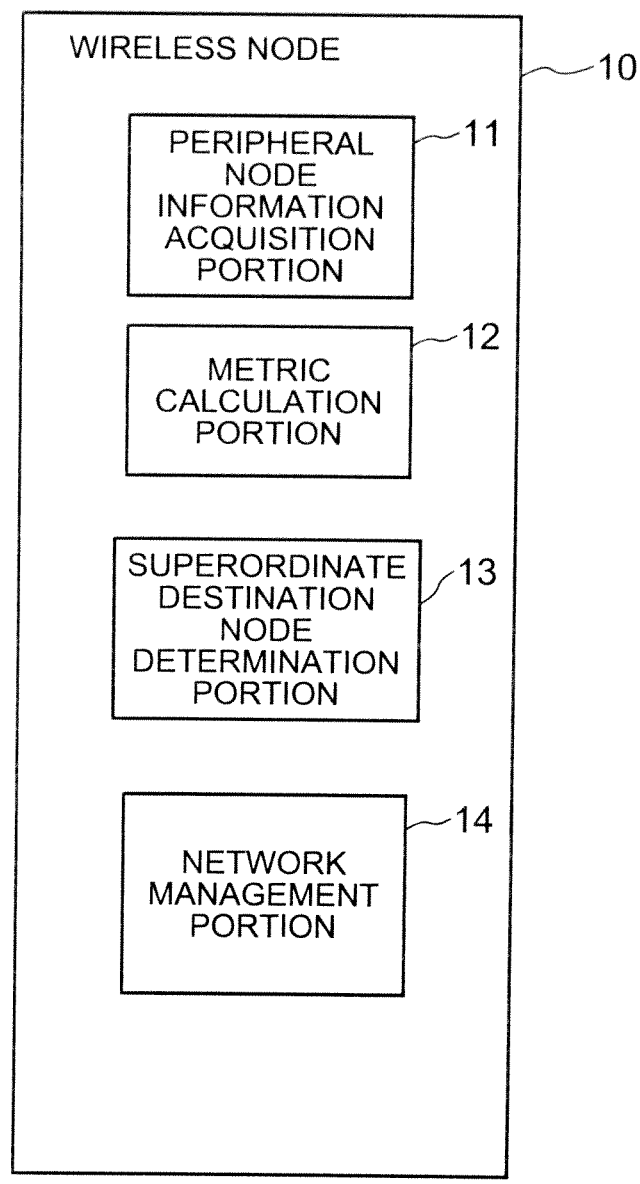
FIG. 15 is a block diagram of a wireless node of the multihop wireless network in accordance with the first exemplary embodiment of the present invention.

Each of the wireless nodes 1 to 9 has, as shown by a wireless node 10 in FIG. 15, a peripheral node information acquisition portion 11, a metric calculation portion 12, and a superordinate destination node determination portion 13.

The peripheral node information acquisition portion 11 has a function of sending node information about its own node through broadcast to peripheral wireless nodes, and a function of acquiring peripheral node information about the node information received from the peripheral wireless nodes. In the first exemplary embodiment, the node information sent from each of the wireless nodes 1 to 9 to the peripheral nodes is composed of a node identifier for uniquely identifying its own node, and a hop number from its own node to a specific wireless node. The node information sent from a certain wireless node through broadcast is received by the other wireless nodes within the area possible for wireless communications with that wireless node as the center. Further, the peripheral node information about the node information received by each of the wireless nodes 1 to 9 from the peripheral wireless nodes is composed of the node identifier, the hop number, and a reception intensity (wireless signal intensity) when receiving the node information. Here in the first exemplary embodiment, the wireless node 1 is taken to be the aforementioned specific wireless node, while the other wireless nodes 2 to 9 are taken to be those in packet communication with the wireless node 1.

The metric calculation portion 12 has a function of calculating a metric value showing a quantity of assigning a guideline for selecting a superordinate destination node to each candidate of the superordinate destination nodes when carrying out multihop wireless communications with the specific wireless node based on the peripheral node information acquired by the peripheral node information acquisition portion 11. In the first exemplary embodiment, each of the wireless nodes 1 to 9 calculates the metric value M with the following formula by utilizing the hop number included in the received node information, and the reception intensity when receiving that node information:

$$M = M_{eh}(e, h) \qquad \text{Formula 1:}$$

where $M = M_{eh}(e, h)$ is a function with the hop number h and the reception intensity e as its arguments to return the metric value M with a larger value for a larger hop number h, or for a smaller reception intensity e. Further, the metric value is taken to be a smaller value for a lower communication cost of link.

The superordinate destination node determination portion 13 has a function of determining the superordinate destination node when carrying out multihop wireless communications with the specific wireless node based on the metric value calculated by the metric calculation portion 12. The superordinate destination node determination portion 13 selects a peripheral node to the superordinate destination node with the smallest metric value of the metric values calculated for each peripheral node.

On the other hand, there is another control node than the above nine wireless nodes 1 to 9. Alternatively, any one of the nine wireless nodes 1 to 9 functions as the control node. In the first exemplary embodiment, explanations are made with the example of letting the wireless node 1 function as the control node.

As shown in FIG. 15, the wireless node 1 functioning as the control node further includes a network management portion 14 in addition to the peripheral node information acquisition portion 11, the metric calculation portion 12, and the superordinate destination node determination portion 13 (other wireless nodes than the control node may not have the network management portion 14). The network management portion 14 has a function of generating a network topology of tree structure with the specific wireless node as the root and other wireless nodes as knots and leaves in the multihop wireless network, a function of selecting a predetermined wireless node as a target wireless node in the generated network topology of tree structure, and a function of intentionally changing the value of the node information sent from the target wireless node to peripheral wireless nodes.

Further, explanations will be made with respect to the function of the network management portion 14 for generating a network topology. In the first exemplary embodiment, the wireless node 1 receives packets from the other wireless nodes 2 to 9 by multihop wireless communication. At this time, a communication history is added to the receiving packets including the wireless node identifier of the source, and the wireless node identifier of the relay point. The network management portion 14 generates the above network topology based on this communication history. Alternatively, the network management portion 14 may as well generate the network topology by the following method. That is, on determining the superordinate destination node, each wireless node notifies the determined superordinate destination node to let the same recognize the existence of its own node as a child node. On receiving this notification, the superordinate destination node transfers the notification to the wireless node 1 which is the control node. Based on the information transferred in, the wireless node 1 is in a position to apprehend which wireless nodes are subordinate to which wireless nodes, that is, what the network topology is.

Further, explanations will be made with respect to the function of the network management portion 14 for selecting the target wireless node. In the first exemplary embodiment, the wireless node 1 selects a wireless node as the target wireless node with a larger number of subordinate wireless nodes compared with the other wireless nodes of the same hierarchy in the network topology of tree structure. For example, the network management portion 14 investigates the number of subordinate nodes (the number of child and grandchild nodes including child nodes and grandchild nodes) of each wireless node belonging to each hierarchy other than the root hierarchy of the network topology, and compares the average or medium value, standard deviation, maximum value, minimum value, and the like, so as to detect the biased places of the number of subordinate nodes. For example, if there are four sensor nodes A, B, C and D in a certain hierarchy, and the number of subordinate nodes is, respectively, 10 units for A, 33 units for B, 9 units for C and 5 units for D, then the average number can be found to be approximately 15 units. At this time, if it is predetermined to detect places with a node number of twice the average value or more as the biased places, for example, then node B is detected as the target wireless node.

Further, explanations will be made with respect to the function of the network management portion 14 for changing the node information. The network management portion 14 carries out a control process to change the node information sent from the target wireless node to the peripheral wireless nodes such that the metric value calculated with the target wireless node as a candidate for the superordinate destination node may become larger in terms of the communication cost of link. In particular, it sends a message of change request to the target wireless node, and receives the replay. In the first exemplary embodiment, the node information sent from a wireless node to the peripheral wireless nodes is the node identifier and hop number, and the metric value is calculated by the above Formula 1. Therefore, the network management portion 14 changes the hop number sent from the target wireless node to the peripheral wireless nodes, to a larger number than the actual hop number. The extent of increasing the number is arbitrary. It may be increased by a predetermined number (one hop number for example), or be rounded off after adding a predetermined fraction (50% for example) to the actual hop number, etc.

Next, operations of the first exemplary embodiment will be explained.

By the peripheral node information acquisition portion 11, the wireless nodes 1 to 9 send, periodically for example, the node information including the hop number from the wireless node 1 to the peripheral wireless nodes. In the initial state, because only the wireless node 1 recognizes the hop number from the wireless node 1, the wireless node 1 sends the hop number 0 to the peripheral wireless nodes through broadcast. Now, suppose that the wireless nodes having received this broadcast are two wireless nodes: the wireless node 2 and the wireless node 3. The wireless nodes 2 and 3 utilize the metric calculation portion 12 to calculate the metric value with the wireless node 1 as a candidate for the superordinate destination node based on the hop number 0 received from the wireless node 1 and the reception intensity, and determine the wireless node 1 to be the superordinate destination node by the superordinate destination node determination portion 13. At this time, suppose that the metric value of the wireless node 1 calculated by the wireless nodes 2 and 3 is 2.0 and 3.0, respectively.

Next, the wireless nodes 2 and 3 send the hop number 1 up to the wireless node 1 determined to be the superordinate destination node to the peripheral wireless nodes through broadcast. Suppose that the wireless nodes having received the broadcast from the wireless node 2 are five units except the wireless node 1: the wireless nodes 4, 5, 6, 7, and 8, while the wireless nodes having received the broadcast from the wireless node 3 are three units except the wireless node 1: the wireless nodes 7, 8, and 9.

The wireless nodes 4, 5 and 6 calculate the metric value with the wireless node 2 as a candidate for the superordinate destination node based on the hop number 1 received from the wireless node 2 and the reception intensity, and determine the wireless node 2 to be the superordinate destination node. At this time, suppose that the metric value of the wireless node 2 calculated by the wireless nodes 4, 5 and 6 is 5.0, respectively. In the same manner, the wireless node 9 calculates the metric value with the wireless node 3 as a candidate for the superordinate destination node based on the hop number 1 received from the wireless node 3 and the reception intensity, and determines the wireless node 3 to be the superordinate destination node. At this time, suppose that the metric value of the wireless node 3 calculated by the wireless node 9 is 6.0.

On the other hand, the wireless nodes 7 and 8 receive the node information from both the wireless nodes 2 and 3. The wireless nodes 7 and 8 calculate the metric values with the wireless nodes 2 and 3 as candidates for the superordinate destination nodes, respectively, and determine the one with the smaller metric value to be the superordinate destination node. Now, suppose that the metric values of the wireless node 2 and the wireless node 3 calculated by the wireless node 7 are 4.5 and 5.5, respectively, while the metric values of the wireless node 2 and the wireless node 3 calculated by the wireless node 8 are 5.0 and 5.5, respectively. That is, although the hop numbers are both 2, the different reception intensities bring about such results. Hence, both the wireless nodes 7 and 8 determine the wireless node 2 to be the superordinate destination node.

Thereafter, from the wireless nodes 4 to 9, the node information is sent to the peripheral nodes and, from the wireless nodes 1 to 3, the node information is sent again to the peripheral nodes. The wireless nodes having received the above node information repeat the calculation of the metric values, and the determination of the superordinate destination node. Here, suppose that there is no change in the result of determining the superordinate destination node. At this stage, the network topology of tree structure is shown in FIG. 16, with the wireless node 1 as the root, and the wireless nodes 2 to 9 as the knots or leaves.

Figure 16:
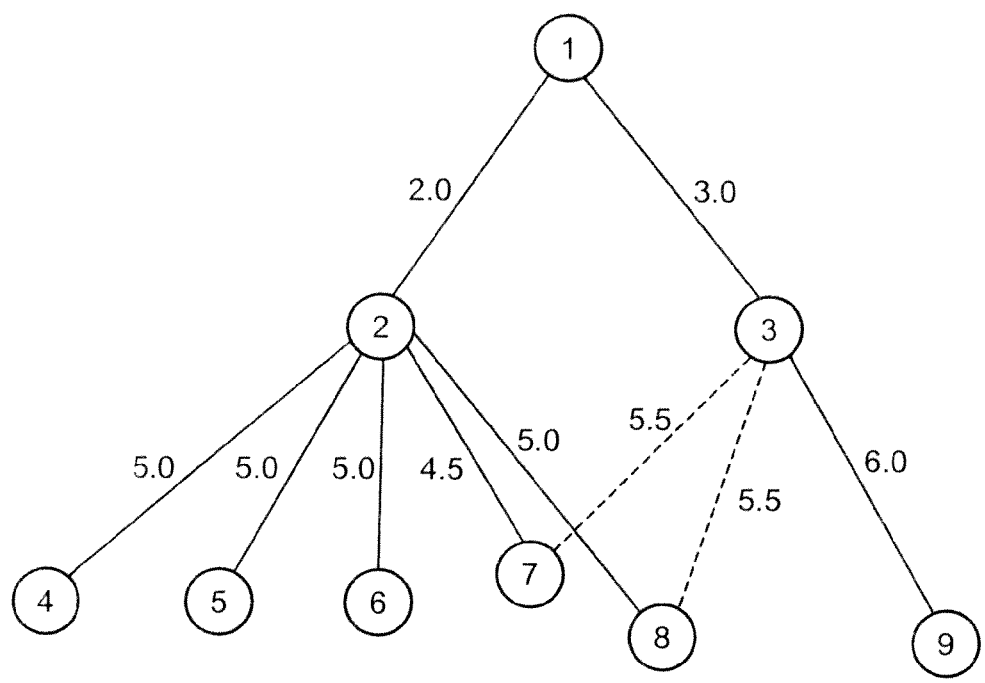
FIG. 16 shows a topology before correcting a bias of the multihop wireless network in accordance with the first exemplary embodiment of the present invention.

In FIG. 16, the solid lines linking upper and lower wireless nodes show that lower wireless nodes select upper wireless nodes as superordinate destination nodes. Further, the dashed lines linking upper and lower wireless nodes show that although lower wireless nodes select an upper wireless node as a candidate for the superordinate destination node, because there is another candidate for the superordinate destination node with a smaller metric value, this candidate is discarded. Further, the numerical values assigned to the solid lines and the dashed lines show the metric values calculated by the lower wireless nodes taking the upper wireless nodes as the objects. Referring to FIG. 16, the number of the subordinate nodes of the wireless node 2 is five, while the number of the subordinate nodes of the wireless node 3 in the same hierarchy is one. This indicates that there is a large bias.

The network management portion 14 of the wireless node 1 which is the control node generates the network topology as shown in FIG. 16, and selects the wireless node 2 as the target wireless node with a larger number of subordinate wireless nodes compared with the other wireless nodes in the same hierarchy. Then, the network management portion 14 of the wireless node I sends a message of change request to the wireless node 2 for changing the hop number to 2, for example, which is sent from the wireless node 2 to the peripheral wireless nodes, as the result of adding a predetermined number 1 to the actual hop number 1. On receiving the message of change request, the peripheral node information acquisition portion 11 of the wireless node 2 sends the hop number 2 different from the actual number to the peripheral nodes after sending a reply to the wireless node 1. On the other hand, the wireless node 3 still sends the actual hop number 1 to the peripheral nodes.

Suppose that the wireless nodes having received the broadcast from the wireless node 2 are, in the same situation as before, are five units except the wireless node 1: the wireless nodes 4, 5, 6, 7 and 8, while the wireless nodes having received the broadcast from the wireless node 3 are three units except the wireless node 1: the wireless nodes 7, 8 and 9.

The wireless nodes 4, 5 and 6 calculate the metric value with the wireless node 2 as a candidate for the superordinate destination node based on the hop number 2 received from the wireless node 2 and the reception intensity, and determine the wireless node 2 to be the superordinate destination node. At this time, suppose that the metric value of the wireless node 2 calculated by the wireless nodes 4, 5 and 6 is 6.5, respectively. In the same manner, the wireless node 9 calculates the metric value with the wireless node 3 as a candidate for the superordinate destination node based on the hop number 1 received from the wireless node 3 and the reception intensity, and determines the wireless node 3 to be the superordinate destination node. At this time, suppose that the metric value of the wireless node 3 calculated by the wireless node 9 is 6.0.

On the other hand, the wireless nodes 7 and 8 receive the node information from both the wireless nodes 2 and 3. The wireless nodes 7 and 8 calculate the metric values with the wireless nodes 2 and 3 as candidates for the superordinate destination nodes, respectively, and determine the one with the smaller metric value to be the superordinate destination node. Now, suppose that the metric values of the wireless node 2 and the wireless node 3 calculated by the wireless node 7 are 6.0 and 5.5, respectively, while the metric values of the wireless node 2 and the wireless node 3 calculated by the wireless node 8 are 6.5 and 5.5, respectively. That is, even though the reception intensities are the same as in the previous situation, the hop numbers are 2 hops for the wireless node 2 but 1 hop for the wireless node 3. This difference brings about such results. Hence, both the wireless nodes 7 and 8 determine the wireless node 3 to be the superordinate destination node.

Thereafter, from the wireless nodes 4 to 9, the node information is sent to the peripheral nodes and, from the wireless nodes 1 to 3, the node information is also sent to the peripheral nodes. The wireless nodes having received the above node information repeat the calculation of the metric values, and the determination of the superordinate destination node. Here, suppose that there is no change in the result of determining the superordinate destination node. At this stage, the network topology of tree structure changes as shown from FIG. 16 to FIG. 17, with the wireless node 1 as the root, and the wireless nodes 2 to 9 as the knots or leaves.

Figure 17:
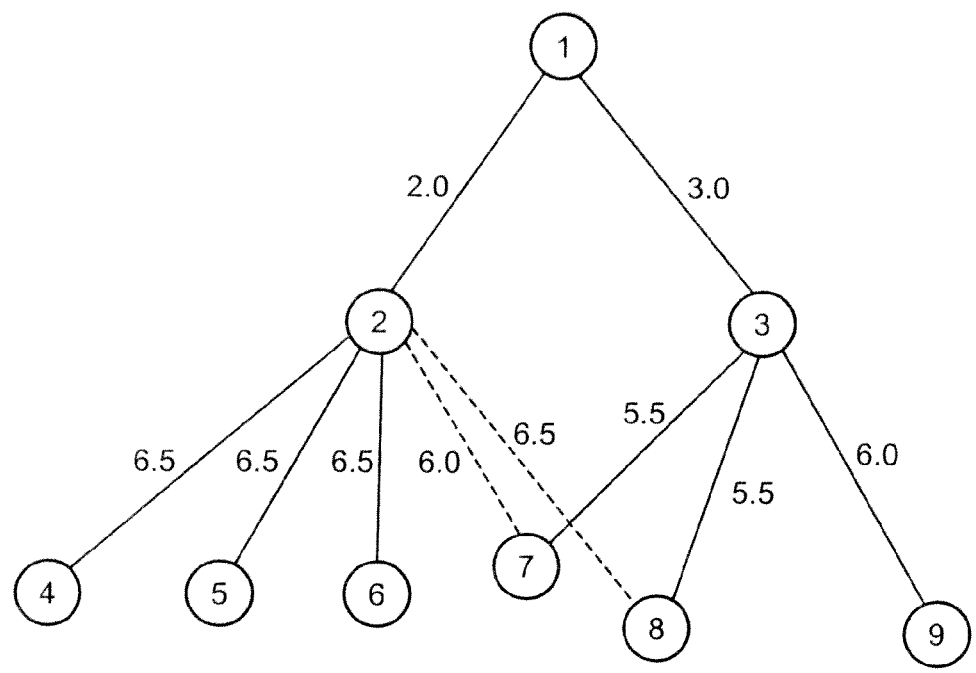
FIG. 17 shows the topology after correcting the bias of the multihop wireless network in accordance with the first exemplary embodiment of the present invention.

Referring to FIG. 17, the number of subordinate nodes of the wireless node 2 changes from 5 to 3 and, as a result, is equal to the number of subordinate nodes of the wireless node 3 in the same hierarchy.

In this manner according to the first exemplary embodiment, it is possible to remove the bias of tree topology in the multihop wireless network system at a lower communication cost. In the above example for instance, the message of change request is sent once from the wireless node 1 which is the control node to the wireless node 2, and the reply is sent once from the wireless node 2 to the wireless node 1, Since from the wireless node 1 to the wireless node 2 is one hop, the total transmissions are two. In contrast to this, if the wireless node 1 sends a message to the wireless nodes 7 and 8 for the request to shift the superordinate destination node from the wireless node 2 to the wireless node 3, and the wireless nodes 7 and 8 send a reply to the wireless node 1, then since from the wireless node 1 to the wireless nodes 7 and 8 are two hops, the total transmissions are eight.

In the first exemplary embodiment, although the node information sent from a wireless node to the peripheral nodes is composed of the node identifier and the hop number, instead of the hop number or in addition to the hop number, other data may as well be utilized. For example, instead of the hop number or in addition to the hop number, the number of child nodes may as well be utilized, which is the number of the wireless nodes selecting its own node as the superordinate destination node. In this case, the metric value M may be calculated by the following formulas:

$$M = M_{ek}(e, k), \qquad \text{Formula 2: and}$$

$$M = M_{ehk}(e, h, k) \qquad \text{Formula 3:}$$

where $M = M_{ek}(e, k)$ is a function with the reception intensity e and the child node number k as its arguments to return the metric value M with a larger value for a larger child node number k, or for a smaller reception intensity e, while $M=M_{ehk}(e, h, k)$ is a function with the reception intensity e, the hop number h, and the child node number k as its arguments to return the metric value M with a larger value for a larger hop number h and child node number k, or for a smaller reception intensity e. Then, in these cases, objects to be intentionally changed to different values from the actual values may be taken as the hop number and child node number, or just the child node number.

Further, in the first exemplary embodiment, although the node information sent from a wireless node to the peripheral nodes is composed of the node identifier and the hop number, instead of the hop number or in addition to the hop number, the metric value of a superordinate destination node may as well be utilized, which is calculated when its own node determines the superordinate destination node. In FIG. 16 for example, the wireless node 2 sends the node information including the metric value 2.0 of the wireless node 1 to the peripheral nodes. In this case, the metric value M may be calculated by the following formulas:

$$M=M^{em}(e, m),\qquad\text{Formula 4: and}$$

$$M=M^{ehm}(e, h, m)\qquad\text{Formula 5:}$$

where $M=M^{em}(e, m)$ is a function with the reception intensity e and the metric value m as its arguments to return the metric value M with a larger value for a larger metric value m, or for a smaller reception intensity e, while $M=M^{ehm}(e, h, m)$ is a function with the reception intensity e, the hop number h, and the metric value m as its arguments to return the metric value M with a larger value for a larger hop number h, for a larger metric value m, or for a smaller reception intensity e. Then, in these cases, objects to be intentionally changed to different values from the actual values may be taken as the hop number h and metric value m, or just the metric value m.

Further, in calculating the metric value, the abovementioned Formulas 1 to 5 may as well be transformed as into the following formulas by utilizing a handicap value which is a weighting parameter value:

$$M=M_{eh}(e, h)+\alpha,\qquad\text{Formula 1':}$$

$$M=M_{ek}(e, k)+\alpha,\qquad\text{Formula 2':}$$

$$M=M_{ehk}(e, h, k)+\alpha,\qquad\text{Formula 3':}$$

$$M=M_{em}(e, m)+\alpha,\qquad\text{Formula 4': and}$$

$$M=M_{ehm}(e, h, m)+\alpha\qquad\text{Formula 5':}$$

In the above formulas 1' to 5', $\alpha$ represents a handicap value. The initial value of a handicap value $\alpha$ is zero. Then, in these cases, in order to remove the bias of tree topology, the handicap value $\alpha$ may be set or changed. That is, in order to remove the bias of tree topology, the wireless node 1, which is the control node, sets or changes the handicap value of the target wireless node 2, and sends the changed handicap value to the wireless node 2 with the message of change request. On receiving the message of change request, the peripheral node information acquisition portion 11 of the wireless node 2 sends the handicap value as one piece of the node information to the peripheral nodes after sending a reply to the wireless node 1. The peripheral wireless nodes having received this node information utilize the latest changed handicap value included in the received node information to calculate the metric value with the wireless node 2 as a candidate for the superordinate destination node.

Further, although there is a unique specific wireless node in the first exemplary embodiment, there may as well be two or more specific wireless nodes. In this case, other wireless nodes than the specific wireless nodes do not communicate with the plurality of specific wireless nodes but communicate with one specific wireless node with a smaller metric value. Therefore, when there are a plurality of specific wireless nodes, the same number of tree topologies are formed as that of the specific wireless nodes. Then, if bias occurs in the number of wireless nodes attributive between the plurality of tree topologies, then a control for removing the above bias may as well be carried out by intentionally changing the data such as the hop number, child node number, metric value, handicap value and the like included in the node information sent from a specific wireless node to the peripheral nodes.

Further, in the first exemplary embodiment, by comparison with other wireless nodes in the same hierarchy of topology, the wireless node 2 with a larger number of subordinate wireless nodes is selected as the target wireless node. However, by comparison with other wireless nodes in the same hierarchy of topology, the wireless node 3 with a smaller number of subordinate wireless nodes may as well be selected as the target wireless node. In this case, the hop number sent by the wireless node 3 to the peripheral nodes may be changed such that the metric value may become smaller in terms of the communication cost of link, calculated with the wireless node 3 as a candidate for the superordinate destination node (that is, a smaller hop number than the actual number is sent to the peripheral nodes). When the hop number is set to be a smaller value than the actual hop number, because it is possible to give rise to a loop in constructing the topology, it is necessary to incorporate a process for avoiding the loop. In the present invention, however, because the process for avoiding the loop is beyond the scope, its details will not be included in the description.

[A Second Exemplary Embodimen]

Next, a second exemplary embodiment of the present invention will be explained in detail.

[Background]

For wireless sensor networks applied to environment measuring systems collecting environment information such as temperature, humidity, and the like, it is necessary to collect the data sensed by each node (sensor node) into one node (sink node). Therefore, as a network topology, it is common to construct a tree topology with the sink node as the apex. This tree topology is generally constructed by a routing protocol suitable for wireless multihop networks.

In the routing protocols utilized in wireless multihop networks, there are proactive routing protocols and reactive routing protocols. The representative example of proactive protocols is the OLSR (Optimized Link State Routing) protocol. The representative example of reactive protocols is the AODV (Ad hoc On-Demand Distance Vector) protocol, and the DSR (Dynamic Source Routing) protocol. The OLSR, AODV and DSR are protocols defined by IETF (Internet Engineering Task Force).

In these routing protocols, based on the reception intensity and hop number, the metric value is calculated to indicate the cost up to the sink node, and a network topology is constructed based on the calculated metric value. Therefore, when applying these routing protocols in wireless sensor networks, each sensor node selects the path (route) up to the sink node with the minimum communication cost of link to construct the network topology.

Further, since there is no prescription for the optimization and equalization method of network topology, individual measures are taken for different systems, or topologies generated by routing protocols are utilized as they are. Therefore, there are problems as follows.

The first problem is that because a sensor node selects the minimum path up to the sink node, bias occurs in the number of nodes connected in the network topology, whereby the communication band cannot be utilized effectively.

The second problem is that in order to equalize the network topology, when sending a message of destination change to each node, it is necessary to augment the process for adjusting the participant nodes as for how to move (concerning the topological shape) what number of units to what places, thereby resulting in the increase of load on the management server.

The third problem is that in order to equalize bias in the network topology, it is necessary to send a message of destination change to each node, thereby compressing the communication band.

An object of the second exemplary embodiment is to provide a method for realizing the equalization of tree topology at a low cost (a small amount of communications and calculations) in a wireless sensor network.

[Outline]

In the second exemplary embodiment, in constructing a tree topology for a wireless sensor network system for collecting sensor data, when bias occurs in the number of nodes constituting every branch of the tree topology, the node number is equalized with a small amount of communications and calculations to disperse the load.

Every node constituting the wireless sensor network constructs a tree topology clustered autonomously with the sink node as the apex by a peripheral node information acquisition unit for sending node information and acquiring peripheral node information, a metric calculation unit for calculating a metric value indicating the cost for reaching the sink node for collecting sensor data, and a destination node determination unit for determining the connection node based on the metric value calculated by the metric calculation unit. At the time, bias may occur in the number of subordinate nodes among the respective branches within the tree topology. In the second exemplary embodiment, for the purpose of removing the bias in the number of subordinate nodes among the respective branches, the number of subordinate nodes is equalized in promoting the motion of the nodes among the respective branches by compulsorily changing the hop number up to the sink node sent from a predetermined sensor node to the peripheral nodes.

In this manner, in the network autonomously constructing a network topology according to the second exemplary embodiment, by intentionally changing the hop number utilized to construct the topology, it is possible to disperse the load in equalizing the number of nodes of tree topology in the wireless sensor network with a small amount of calculations and communications. Hereinbelow, the configuration and operation of the second exemplary embodiment will be explained.

[Configuration]

Figure 1:
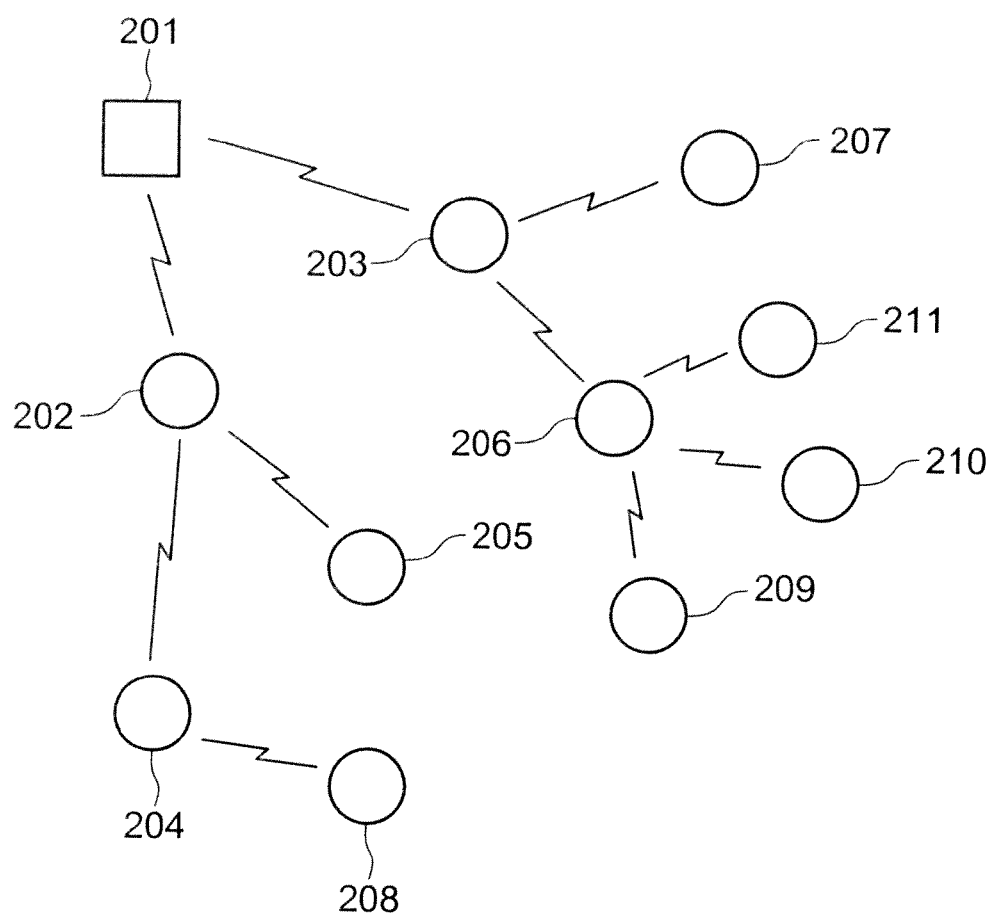
FIG. 1 shows an example of physical configuration of a wireless sensor network in accordance with a second exemplary embodiment of the present invention.

FIG. 1 shows a physical configuration utilizing a sink node and sensor nodes in accordance with the second exemplary embodiment. Referring to FIG. 1, the sink node 201 is a device for collecting the information sensed by sensor nodes 202 to 211 from these sensor nodes 202 to 211. The sensor nodes 202 to 211 are installed indoors or outdoors to sense external information, and send the sensed information to the sink node 201. Further, in FIG. 1, the zigzag lines linking respective nodes show a relationship of carrying out wireless communications.

Figure 2:
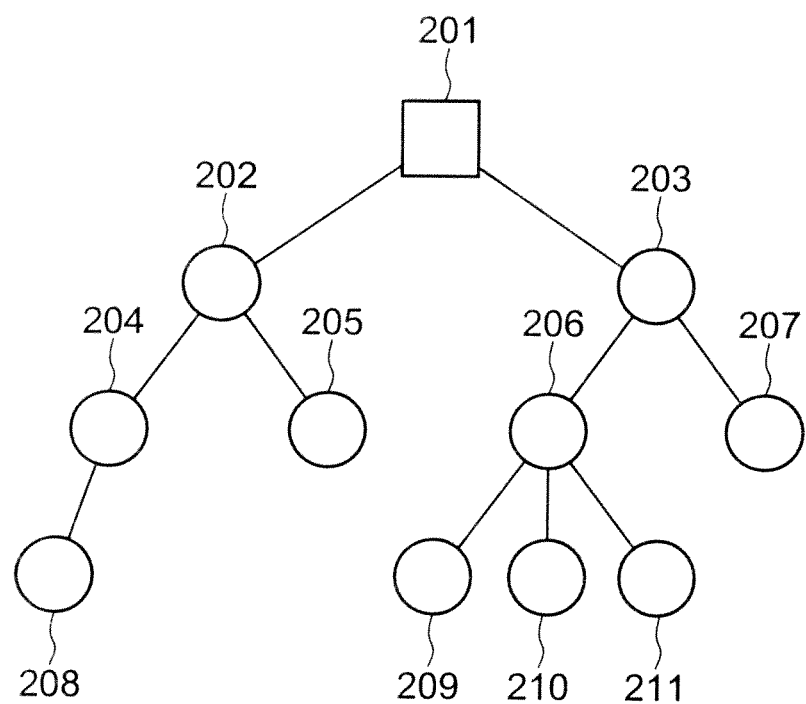
FIG. 2 shows a connectional relation between nodes of the wireless sensor network in accordance with the second exemplary embodiment of the present invention.

FIG. 2 logically shows a connectional relationship between the sink node 201 and the sensor nodes 202 to 211. In FIG. 2, the straight lines linking respective nodes show a relationship of carrying out wireless communications. In the second exemplary embodiment, a tree topology is configured as shown in FIG. 2, where the basic configuration is to collect the information sensed by the sensor nodes 202 to 211 with the sink node 201 as the starting point.

Figure 3:
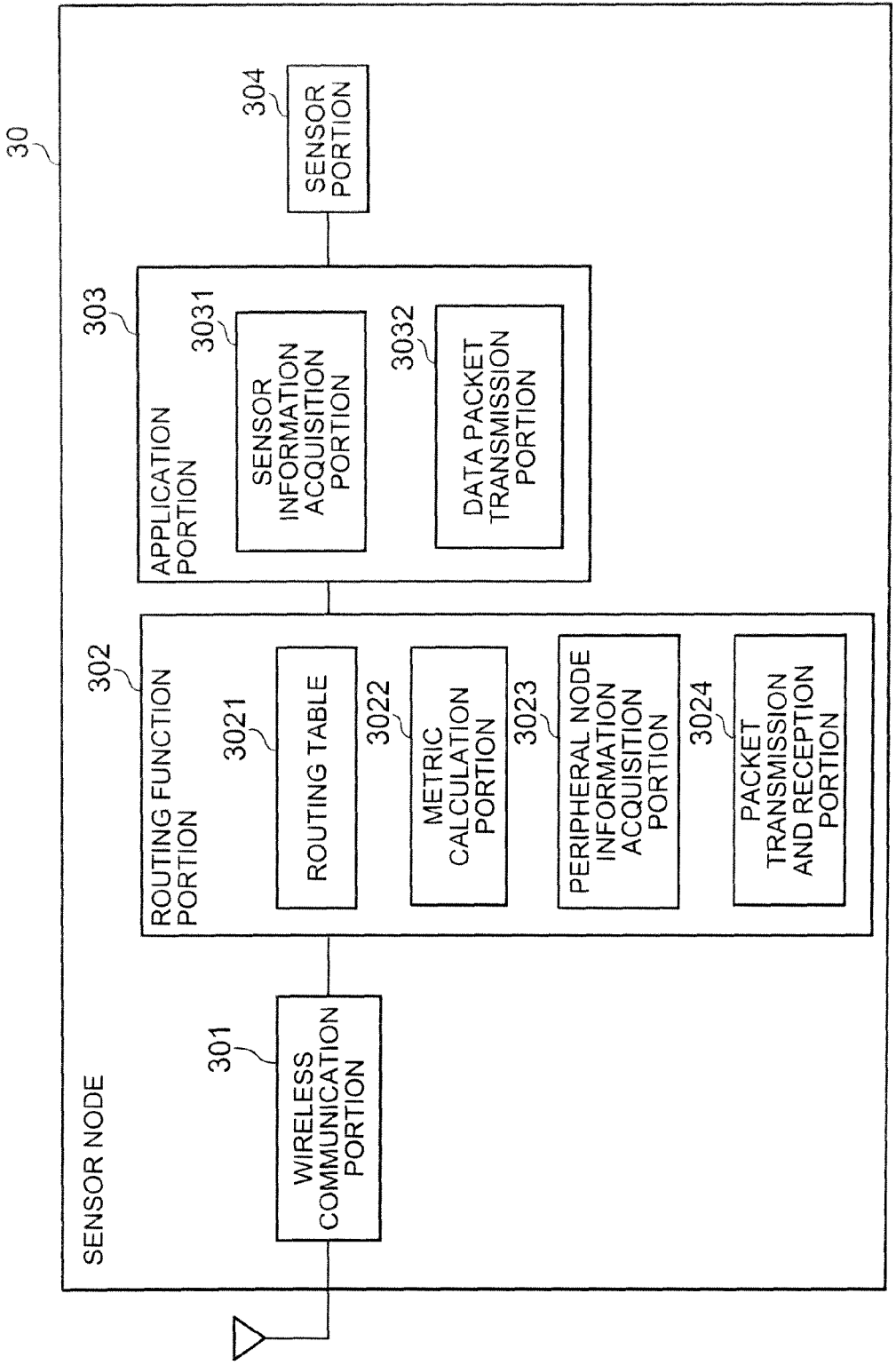
FIG. 3 is a block diagram of a sensor node of the wireless sensor network in accordance with the second exemplary embodiment of the present invention.

FIG. 3 shows an internal configuration of a sensor node. In FIG. 3, the sensor node 30 is any one of the sensor nodes 202 to 211 shown in FIGS. 1 and 2. The sensor node 30 has a wireless communication portion 301, a routing function portion 302, an application portion 303, and a sensor portion 304.

The wireless communication portion 301 has a function of sending and receiving wireless communication data to and from the routing function portion 302, and carrying out wireless communications with other nodes. The wireless communication portion 301 is configured by a module or circuit capable of carrying out wireless communications by wireless LAN, ZigBee, power saving wireless system, and the like.

The routing function portion 302 includes a routing table 3021, a metric calculation portion 3022, a peripheral node information acquisition portion 3023, and a packet transmission and reception portion 3024.

The routing table 3021 is a table for storing peripheral node information obtained from the peripheral node information acquisition portion 3023 such as the node identification information, reception intensity, and the hop number up to the sink node. Further, along with the peripheral node information, the routing table 3021 also stores tree topology information such as the metric value calculated by the metric calculation portion 3022, superordinate nodes, and subordinate nodes. This routing table 3021 is the table for determining the destinations of packets.

The metric calculation portion 3022 has a function of calculating the metric value of link with a relevant node from the node identification information, reception intensity and the hop number up to the sink node obtained from the peripheral node information acquisition portion 3023, and determining the superordinate destination node.

The peripheral node information acquisition portion 3023 has a function of acquiring the node identification information, the packet reception intensity and the like from the received packet message. Further, the peripheral node information acquisition portion 3023 has a function of sending the node identification information, the hop number up to the sink node, and the like as the node information of its own node information to the peripheral nodes.

The packet transmission and reception portion 3024 has a function of sending and receiving packets with the wireless communication portion 301, and a function of sending and receiving data packets with the application portion 303. Further, the packet transmission and reception portion 3024 also has a function of retransferring the packets which are not directed to its own node but received from the wireless communication portion 301 and need to be transferred.

The application portion 303 includes a sensor information acquisition portion 3031 and a data packet transmission portion 3032.

The sensor information acquisition portion 3031 has a function of acquiring the data sensed by the sensor portion 304.

The data packet transmission portion 3032 has a function of sending the sensor data acquired by the sensor information acquisition portion 3031 as data packets.

The sensor portion 304 has a function of sensing a predetermined physical quantity such as temperature, humidity, electricity, and the like, and a mechanism of notifying the application portion 303 of the data of the sensed physical quantity.

Further, in the second exemplary embodiment, the wireless specifications utilized in the wireless communication portion 301 are wireless LAN, ZigBee, and power saving wireless system. However, in so far as possible to carry out wireless communications, other wireless communication specifications may as well be utilized such as Bluetooth and the like. In the metric calculation portion 3022, the information acquired from the peripheral node information acquisition portion 3023 is the node identification information, reception intensity, and the hop number up to the sink node. However, the information utilized for calculation is not particularly limited but may be any information acquirable from the peripheral node information acquisition portion 3023 or calculated by utilizing information related to the peripheral nodes such as the remaining charge of batteries. In the peripheral node information acquisition portion 3023, although the acquisitive information is the node identification information, packet reception intensity, and the like, it is not particularly limited but may be any information related to the peripheral nodes. In the sensor portion 304, although the sensing physical quantity is temperature, humidity, and electric quantity, it is not particularly limited but may be other than the exemplified three types in so far as the sensing physical quantity is sensible information.

Figure 4:
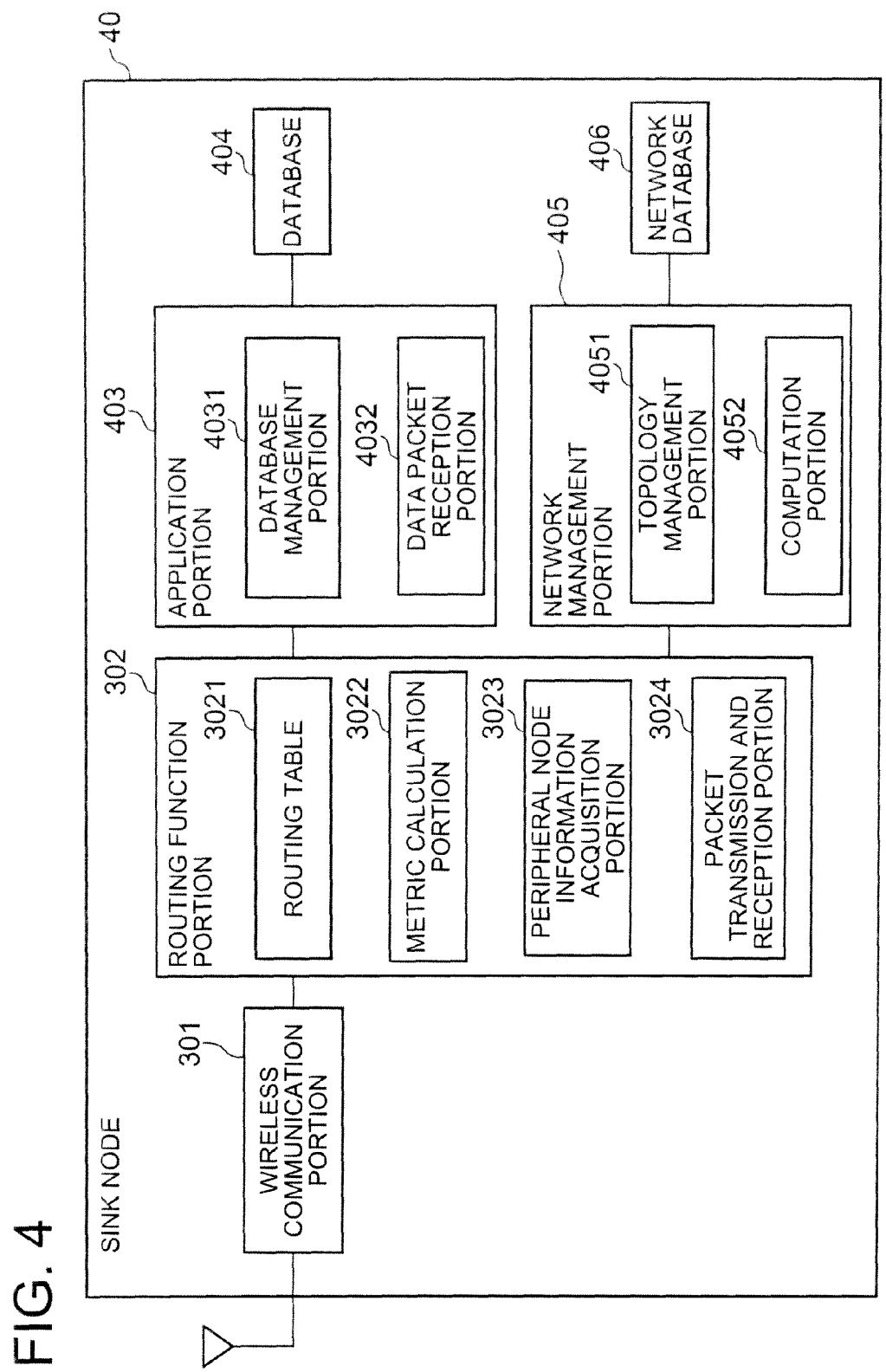
FIG. 4 is a block diagram of a sink node of the wireless sensor network in accordance with the second exemplary embodiment of the present invention.

FIG. 4 shows an internal configuration of a sink node. According to this FIG. 4, the sink node 40 corresponds to the sink node 201 of FIGS. 1 and 2. The sink node 40 has a wireless communication portion 301, a routing function portion 302, an application portion 403, a database 404, a network management portion 405, and a network database 406.

The wireless communication portion 301 and the routing function portion 302 have the same functions as the wireless communication portion 301 and the routing function portion 302 of the sensor node 30 shown in FIG. 3, respectively.

The application portion 403 includes a database management portion 4031 and a data packet reception portion 4032.

The database management portion 4031 has a function of writing the sensor data obtained from the data packet reception portion 4032 into the database 404.

The data packet reception portion 4032 has a function of receiving data packets from the routing function portion 302, and taking out the node identification information and sensor data from the received packets to pass the same to the database management portion 4031.

The database 404 is a database for associating the node identification information and sensor data obtained from the application portion 403, and storing the same.

The network management portion 405 includes a topology management portion 4051 and a computation portion 4052.

The topology management portion 4051 stores the tree topology information derived by the computation portion 4052 into the network database 406. Further, it periodically monitors the tree topology information and, if there is bias, requests the computation portion 4052 to carry out an equalization process. Further, in order to reflect the hop number calculated for equalization in the computation portion 4052 to the relevant node, it acquires the routing information from the network database 406, and notifies the relevant node through the routing function portion 302 after generating message packets of value change.

From the routing function portion 302, the computation portion 4052 acquires the routing information in the packets received from a sensor node and, by integrating the same with the routing information stored in the network database 406, derives the tree topology of the whole sensor network. Further, when requested for the equalization process from the topology management portion 4051, it accesses the network database 406, calculates the hop number to be set to the relevant node for carrying out the equalization of node number bias in the derived tree topology, and notifies the topology management portion 4051.

The network database 406 is a database for storing the topology information and routing data obtained from the network management portion 405.

Further, in the second exemplary embodiment, the database 404 of the sink node 40 stores sensor data, while the network database 406 stores tree topology information, respectively. However, it is also configurable to provide an alternative server with the functions of the database 404 and the network database 406.

[Operation]

Next, utilizing the time chart shown in FIG. 5, the basic operations of the sink node and sensor nodes will be explained.

Figure 5:
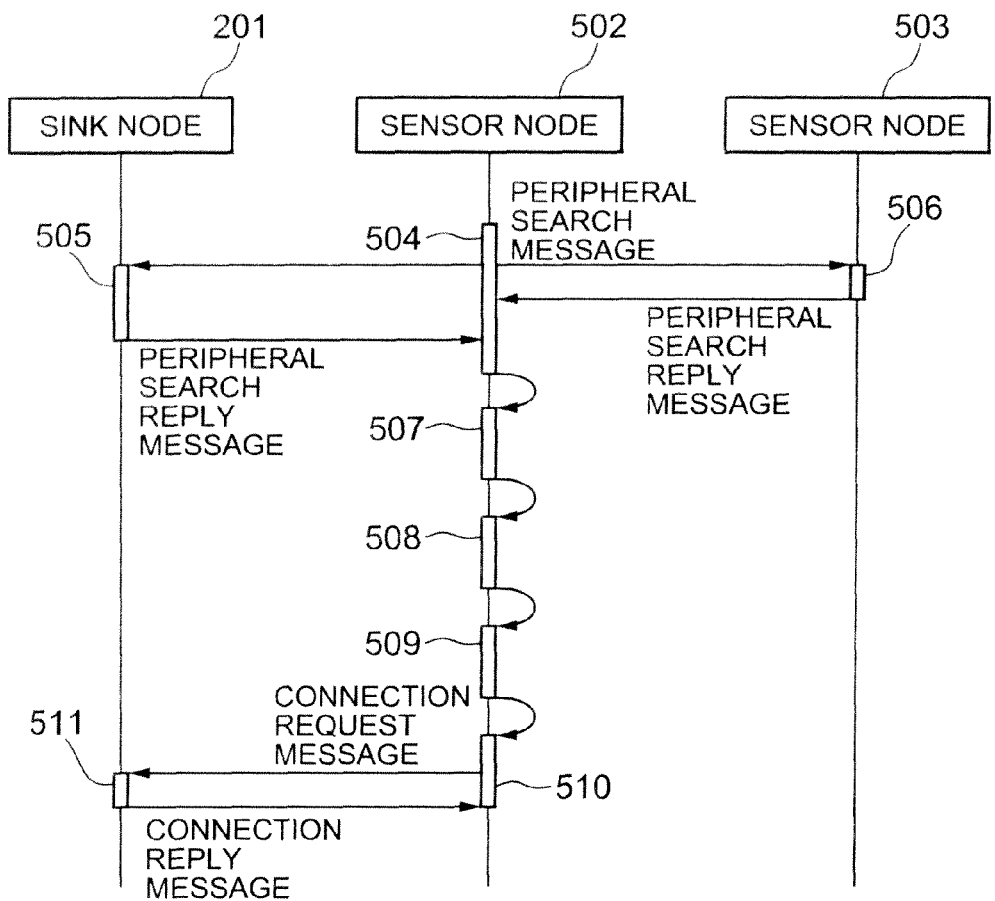
FIG. 5 is a time chart showing a basic operation of the wireless sensor network in accordance with the second exemplary embodiment of the present invention.

FIG. 5 shows an example of operating a proactive routing protocol. In the proactive routing protocol, each sensor node periodically carries out a process of constructing network topology to construct a tree topology by determining the destination node. The time chart of FIG. 5 shows the operation when the sensor node 502 carries out the process of constructing a tree topology. In FIG. 5, the sensor nodes 502 and 503 represent any two sensor nodes of the sensor nodes 202 to 211 of FIGS. 1 and 2.

In FIG. 5, the sensor node 502 carries out a process of peripheral node information acquisition 504 to sand a peripheral search message through broadcast. The broadcast is a method for transmission to all nodes by designating the broadcast address to be the destination address. Further, the peripheral search message includes the status of the sensor node 502 of participation in the network topology, the hop number up to the sink node, and the like.

On receiving the peripheral search message, the sink node 201 and the sensor node 503 send a reply message of peripheral search through unicast to the peripheral search message, respectively, (505 and 506). The unicast is a method for transmission to a node by designating the address of that node to be the destination address. Further, the reply message of peripheral search includes the status of participation in the network topology, the hop number up to the sink node, and the like.

On receiving the reply message of peripheral search, the sensor node 502 acquires the status of participation in the tree topology, the hop number up to the sink node and the like included in the reply message of peripheral search. Further, it also acquires the reception intensity when receiving the reply message of peripheral search.

In this manner, by the peripheral node information acquisition 504, it is possible to acquire information of the communicable peripheral nodes by receiving the peripheral search message and sending the reply message of peripheral search between the peripheral nodes.

Next, a process of metric calculation 507 is carried out. The metric calculation 507 is a process for calculating a metric value indicating the path cost from its own node to the sink node for each peripheral node, from the peripheral node information obtained by the peripheral node information acquisition 504. Although varying with different routing protocols, here, the metric value is calculated from the reception intensity of the acquired peripheral node information and the hop number up to the sink node. Further, in the second exemplary embodiment, the routing protocol is applied such that the lower the cost, the more favorable the communication situation up to the sink node.

Next, a process of routing table update 508 is carried out. The routing table update 508 is a process for writing the metric values of peripheral nodes calculated by the metric calculation 507 into the routing table.

Next, a process of destination node determination 509 is carried out. The destination node determination 509 selects the node with the smallest metric value (the lowest cost) in the routing table. From the selected result, it confirms whether or not the selected node is currently connected and, if it is not currently connected, then a destination change process 510 is carried out. The destination change process 510 is a process for informing the superordinate destination node of the new destination of the presence of its own node as a child node. On receiving the message by the destination change process 510, the superordinate destination node recognizes the node sending the message as a child node, and transfers the message to the sink node 201.

The network topology is constructed by repeating the above processes.

FIG. 2 is a diagram of the network topology generated by carrying out the above processes, where there is bias in the topology. Hereinbelow, explanations will be made with respect to an outline of the process for equalizing the topology to correct the bias, Referring to FIG. 2, the tree topology has the sink node 201 as the apex, and the maximum hop number from the sink node is three hops. Further, the sensor nodes having child nodes (the sensor nodes 202, 203, 204 and 206) are referred to as cluster head nodes. In the example of FIG. 2, the cluster head node 206 accommodates the largest number of child nodes, which are three units.

Figure 6:
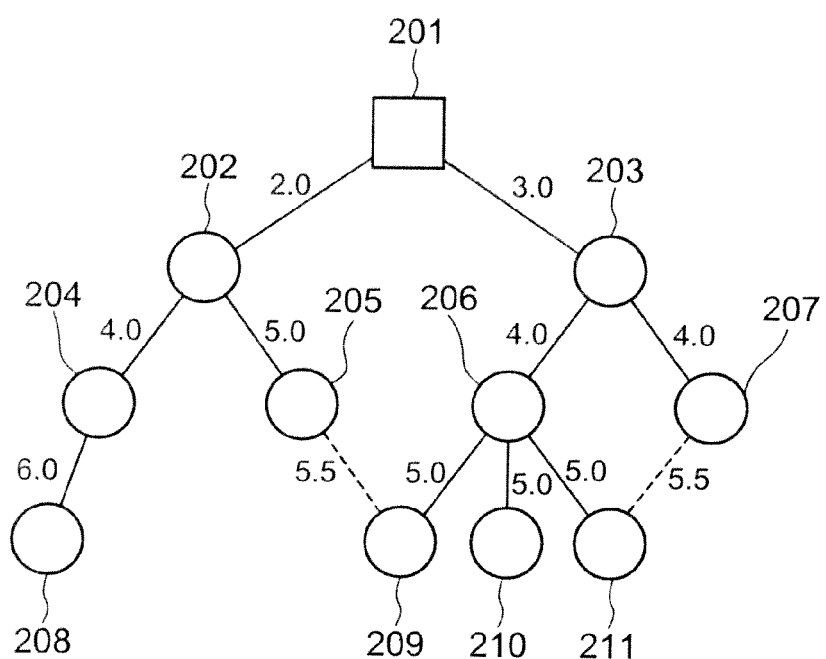
FIG. 6 shows a tree topology before correcting a bias of the wireless sensor network in accordance with the second exemplary embodiment of the present invention.

Referring to FIG. 6, the metric value is added to each link in the logical configuration diagram of FIG. 2. The dashed lines between the respective nodes show the links which are connectable but are not selected as the destinations at the time of constructing the topology.

In the tree topology of FIG. 6, focusing on the second hop, the number of child nodes of the sensor node 204 is one unit, the number of child nodes of the sensor node 206 is three units, and the sensor nodes 205 and 207 have no child nodes. Thus, more child nodes are connected to the sensor node 206, and thereby there is bias in the number of subordinate nodes of the tree topology. In this situation, the sensor node 206 utilizes the memory three times as much as the other nodes (204, 205, and 207) of the second hop, or more, to manage the subordinate nodes, and transfers data three times as much as the other nodes (204, 205, and 207) of the second hop, or more, in collecting the sensor data. Therefore, both the processing load and the network load are at a high level.

In the second exemplary embodiment, by changing the hop number from the sensor node 206 to the sink node sending data to the peripheral nodes, the processing load on the sensor node 206 and the network load are both reduced. The processing contents will be explained by utilizing the processing flow of FIG. 7.

Figure 7:
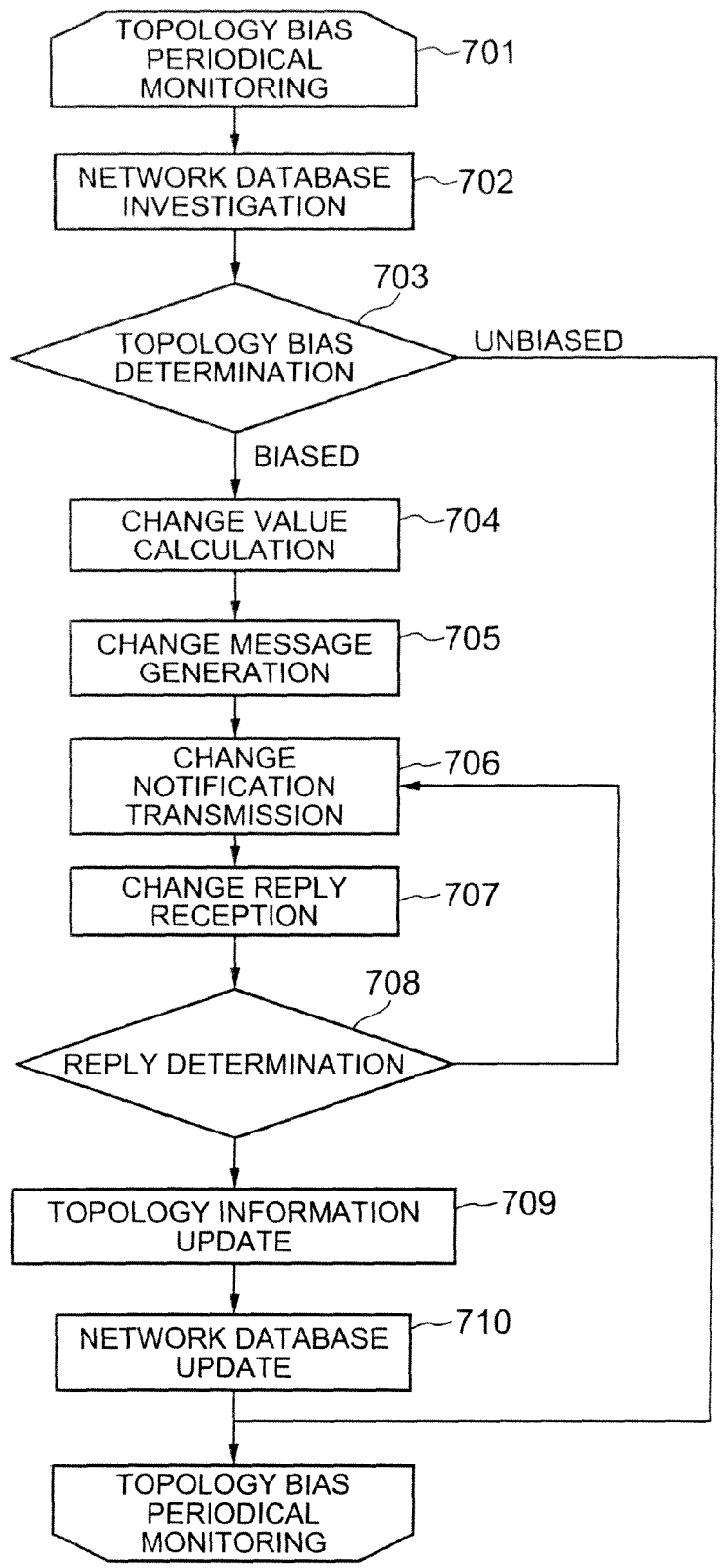
FIG. 7 is a flow chart showing a process for correcting the topological bias carried out by the sink node of the wireless sensor network in accordance with the second exemplary embodiment of the present invention.

Referring to FIG. 7, the sink node 201 periodically carries out a process of topology bias periodical monitoring 701. The periodical monitoring may be carried out either per hour or per month at a long interval. However, if a short period of time is set for the periodical monitoring, the processing load on the sink node will increase. Further, if a long period of time is set for the periodical monitoring, because the bias in node number of the tree topology continues, the communication load on a specific link will not be removed. Therefore, the periodical time may be set from the number of participant nodes, and the like. In the second exemplary embodiment for example, suppose that the sensing object is the quantity of electricity usage of an electric meter and, considering this, the period of the topology bias periodical monitoring 701 is one day. Needless to say, however, the period is not limited to such length.

Next, by the topology bias periodical monitoring 701 carried out per day, a process of network database investigation 702 is carried out. In the network database investigation 702, the topology management portion 4051 investigates whether or not there is any bias from the topology information stored in the network database 406.

FIG. 8 is an example of configuration of the tree topology stored in the network database 406, The network database 406 retains the hop number up to the node 201, the superordinate destination node, the metric value of the superordinate destination node, the number of child nodes, the change flag, and the change value, corresponding to the node identifier of the nodes 201 to 211, For example, the sixth line shows that for the sensor node 206, the hop number up to the sink node 201 is two, the superordinate destination node is the sensor node 203 for communications with the sink node 201, the metric value calculated for the sensor node 203 is 4.0 when selecting the sensor node 203 as the superordinate destination node, the child node number is three, the change flag is zero (no change), and the change value is not set. Further, the information stored in the tree topology information is not limited to that shown in FIG. 8. For example, other information may added such as the identifiers of the sensor nodes existing in the periphery, the metric values calculated in taking those nodes as candidates for the superordinate destination node, as well as the routing information, the connectional condition of each node, and the like.

Referring to the tree topology information of FIG. 8, two nodes have the hop number 1 (202 and 203), and are connected respectively with two child nodes. Four nodes have the hop number 2 (204, 205, 206, and 207), and the number of connected child nodes is, three to the sensor node 206, one to the sensor node 204, and zero to the other nodes. Four nodes have the hop number three (208, 209, 210, and 211), and the number of connected child nodes is zero to all the sensor nodes. From these results, in the nodes of the hop number 2, it is understood that there is bias in the number of subordinate node, and thus in the topology bias determination 703, the process proceeds to the "biased" direction. If it is determined that there is no bias, then no particular process is carried out but stand by until the next period.

Change value calculation 704 is a process for calculating the hop number for the sensor node 206 to notify of in the peripheral search message in order to remove the bias of the node number in the tree topology. In the second exemplary embodiment, the change value calculation 704 calculates the hop number for the sensor node 206 to notify of in the peripheral search message by adding 1 to the actual hop number 2 so as to change the same to the hop number 3, and carries out the equalization of the node number in the tree topology. It may calculate the change value by utilizing the data in the tree topology information 80 only, or by adding other information such as positional information, power consumption, and the like. The calculated change value is recorded in the tree topology information 80 of FIG. 80.

Next, in a process of change message generation 705, the topology management portion 4051 notifies the routing function portion 302 of the calculated change value of the hop number, and the packet transmission and reception portion 3024 generates a message for sending a request to the relevant node (the sensor node 206). Thereafter, in a process of change notification transmission 706, the transmission is carried out through the wireless communication portion 301. This message of change request is relayed by the sensor node 203 and sent to the sensor node 206.

The sensor node 206 receives the above message of change request by the routing function portion 302 through the wireless communication portion 301. The packet transmission and reception portion 3024 notifies the peripheral node information acquisition portion 3023 of the content of the received message of change request, and the peripheral node information acquisition portion 3023 stores the same as a compulsory change value. Thereafter, a reply message of change is sent from the wireless communication portion 301 to the sink node 201. In the sink node 201 having received this reply message of change, if the change is carried out, then the relevant change flag is set to 1 (changed) in the tree topology of FIG. 8.

If a change value is stored, then the peripheral node information acquisition portion 3023 of the sensor node 206 utilizes the change value instead of the hop number 2 as calculated by adding 1 to the hop number 1 up to the sink node sent by the sensor node 203 selected by its own node sensor node 206. If no change value is stored, then it utilizes the hop number 2 calculated above as it is. On storing a change value, the peripheral node information acquisition portion 3023 of the sensor node 206 immediately utilizes the change value (or waits until the next period comes), and sends the message of peripheral search through broadcast. That is, in the present example, the sensor node 206 sends the hop number up to the sink node 201 as three hops in spite of the actual hop number 2. On receiving the message of peripheral search, the peripheral sensor nodes 205, 209, 210, 211, and the like calculate the metric value with the sensor node 206 as a candidate for the superordinate destination node. As a result, if there are other candidates for the superordinate destination node with a smaller metric value than that of the sensor node 206, then the destination change process is carried out.

In a process of metric change reply reception 707, the sink node 201 confirms the processing result of reflecting the designated change value and, if the change is not allowed in a process of reply determination 708, then it carries out the process of the change notification transmission 706 once again (at this time, it returns the relevant change flag to zero in the tree topology information of FIG. 8, and deletes the change value). If the process is repeated a number of times but the change is still not allowed, then the sink node 201 ends the process and returns to the periodical monitoring state. On the other hand, if the change is completed, then it waits to receive the destination change notification just for a certain period of time and, on receiving the destination change notification, reconstructs the topology in a process of topology information update 709, and reflects that result to the database in a process of network database update 710.

Figure 9:
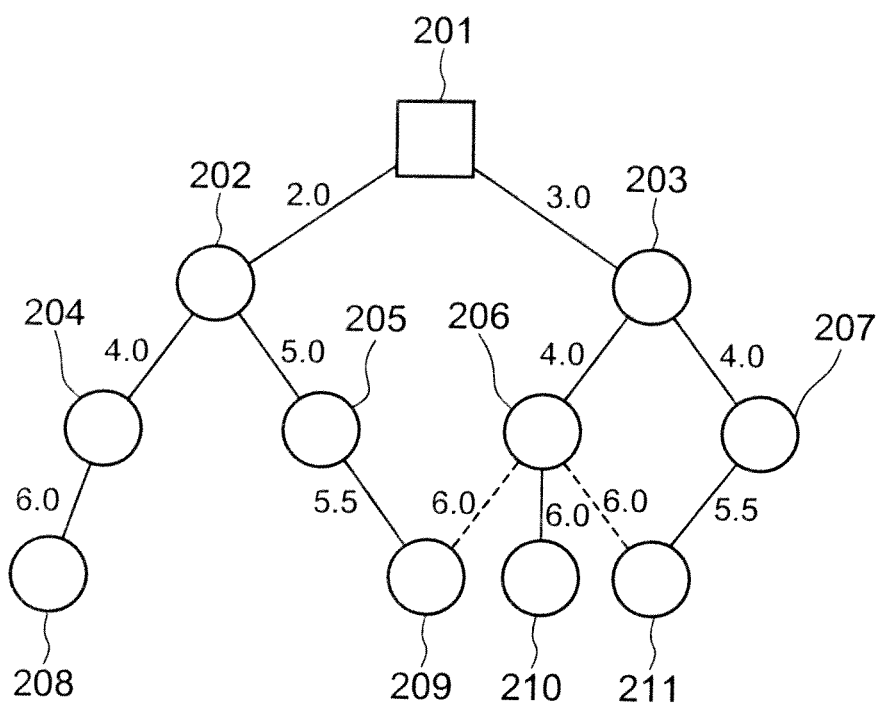
FIG. 9 shows the tree topology after correcting the bias of the wireless sensor network in accordance with the second exemplary embodiment of the present invention.

FIG. 9 shows the tree topology reconstructed in the topology information update 709. Referring to FIG. 9, the tree topology is in an equalized state. This is because the sensor nodes 209 and 211 have selected the sensor nodes 205 and 207 as the superordinate destination nodes instead of the sensor node 206 by the change from 2 to 3 of the hop number sent from the sensor node 206. By virtue of this, the number of the subordinate nodes connected to the sensor node 206 reduces from 3 to 1, thereby allowing the load to be dispersed. Further, it is possible to equalize the tree topology as all subordinate nodes have become one unit to the sensor nodes (204, 205, 206 and 207) at the second hop.

At the time of the above process of connection change, the number of messages sent to the network is two: the request and reply messages; the number of transmissions is the hop number 2, and the total number of transmissions is four. In contrast to this, when the message of destination change is sent to each of the sensor nodes 209 and 211, the number of messages is totally four with two requests and two replies. Therefore, the number of transmissions is the hop number 3, and the total number of transmissions is 12. From these results, in the second exemplary embodiment, the number of transmissions reduces to one third, whereby it is possible to realize the equalization of node number in the tree topology and the load dispersion in the network while suppressing the communication load on the network.

[Effects]

In this manner, the second exemplary embodiment has such effects as described below. The first effect is, because the bias of node number in the tree topology is equalized by providing the superordinate node, but not the subordinate node of shifting destination, with a message of request to change the hop number to be sent to the peripheral nodes, the communication amount is suppressed when carrying out the load dispersion by the equalization of the tree topology.

The second effect is, when equalizing the bias of node number in the tree topology, because it is not necessary to calculate which sensor node should change the connection to which sensor node, the calculation amount can be reduced.

The third effect is, even if the hop number is compulsorily changed, because each sensor node autonomously determines the superordinate destination node with the smallest metric value from the candidates for the superordinate destination node, it is still possible to carry out the equalization while the communicable state is maintained as it is.

Further, in the second exemplary embodiment, although the example is shown to compulsorily change the hop number, as already explained in the first exemplary embodiment, it is also possible to take other data than the hop number to be the change objects such as the child node number, the metric value, and the handicap value.

Further, an arbitrary method may be utilized to deactivate the setting of the compulsory change value. For example, the setting may be deactivated after a predetermined period of time
has elapsed since it was set.

[A Third Exemplary Embodiment]

A third exemplary embodiment shows an application of the present invention to automated meter reading systems and the like for wirelessly reading meters of usage of electricity, gas, and tap water. An automated meter reading system has a large-scale network with a plurality of sink nodes. Therefore, it is necessary to equalize the number of attributive nodes among the sink nodes.

In the second exemplary embodiment, since there is only one sink node, one tree topology is constructed, and the bias of node number is equalized for that tree topology. In the third exemplary embodiment, explanations will be made for the case that there are two sink nodes. Further, the equalization can be realized in the same manner as for the case of more than two sink nodes.

Figure 10:
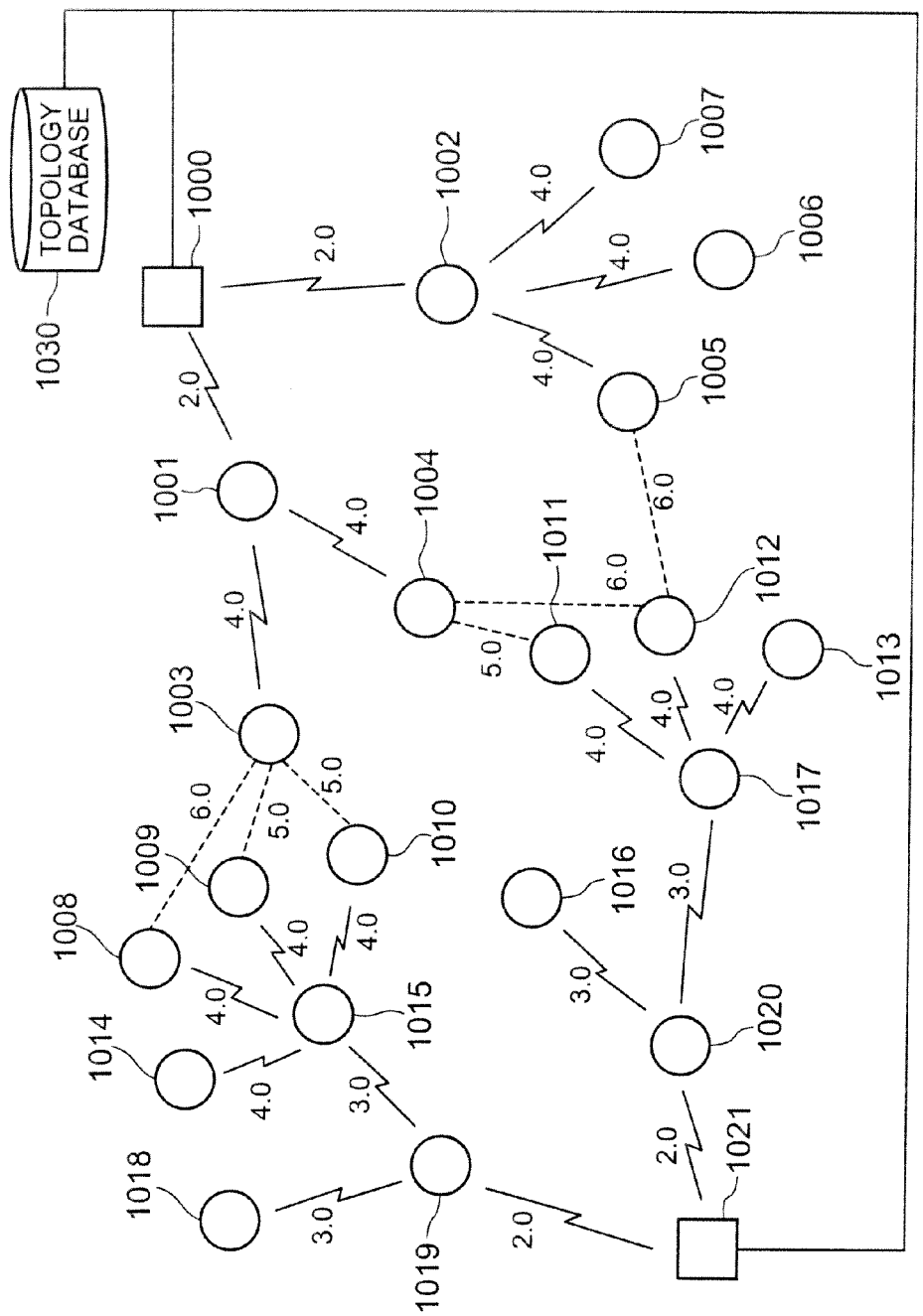
FIG. 10 shows a connectional relation before correcting a bias between nodes of a wireless sensor network in accordance with a third exemplary embodiment of the present invention.

Referring to FIG. 10, there are two sink nodes 1000 and 1021. which are connected to a wired network, and further connected through wired lines to a topology database 1030. The topology database 1030 has a function of storing network information and sensing data, and a function of correcting bias. In FIG. 10, the zigzag lines show wireless links between respective nodes, and the numerical value assigned to each link shows the metric value of a subordinate node to the superordinate destination node. Further, the dashed lines show the spare links unutilized in connections but capable of communications.

FIG. 11 shows topology information 110 in the topology database before the bias is corrected. Referring to FIG. 11, corresponding to the identifier of each node, the topology information 110 contains the hop number up to the sink node, the superordinate destination node in communication with the sink node, the metric value calculated in selecting the superordinate destination node, the (code) number of the sink node as the destination of sending information, the change flag, and change value. However, the information contained in the topology information 110 is not limited to these. For example, it may also include information of the peripheral nodes. It is understood from the tree topology information 110 that the number of the sensor nodes attributing to the sink node 1021 is thirteen, the number of the nodes attributing to the sink node 1000 is seven, and there is bias in the attributive node number between the sink nodes. The topology database 1030 is provided with an investigation function on topology bias and an equalization function to carry out the operation of equalizing the node number between the sink nodes.

In the topology database 1030, the topology bias periodical monitoring 701 is carried out to periodically examine the bias by comparing the attributive node numbers between the sink nodes. In the example of FIG. 10, there are totally 20 sensor nodes in the network.

Hereinbelow, explanations will be made with an example of the method for detecting bias of the node number between tree topologies in a network. First, the quotient (10 units) of the number of all sensor nodes divided by the number of sink nodes is taken to be the average number of attributive nodes (Formula 6). Then, a certain quantity is set to be the allowed difference between the attributive node number and the average node number (20% in the third exemplary embodiment), and the allowed number for difference (two units) is calculated from the number of average attributive nodes (Formula 7). Then, the threshold node number for determining to carry out equalization is calculated based on the number of average attributive nodes and the allowed number for difference (Formula 8), and the result is utilized to carry out the determination. In the third exemplary embodiment, on the threshold node number for determining to carry out equalization, the lower limit is set to be 8 units, and the upper limit is set to be 12 units.

Number of all nodes÷Number of all sink nodes=Number of average attributive nodes; Formula 6:

Number of average attributive nodes×0.2=Allowed number for difference; Formula 7: and Number of average attributive nodes±Allowed number for difference=Threshold node number for determining to carry out equalization. Formula 8:

The above calculation method does not particularly limit whether or not to include the allowed number of difference, the threshold node number for determining to carry out equalization in carrying out the determination, etc.

If the calculated threshold node number for determining to carry out equalization is utilized to carry out the topological bias determination (703), then it is determined that there is bias in the attributive node number of each sink node.

Next, the topology database 1030 selects the sink node 1021 as the target node with a larger subordinate node number than the sink node 1000, and intentionally changes the hop number sent from the sink node 1021 to the peripheral nodes to a different value from the actual value. Here, the actual hop number 0, for example, is compulsorily changed to the hop number 1.

FIG. 12 shows topology information 120 in the topological database after a certain period of time has elapsed since the hop number of the sink node 1021 was changed to 1. Further, in the topology information 120, underlines are drawn at the places of changing the metric value and the superordinate destination node. Further, FIG. 13 shows the tree topology after the certain period of time has elapsed since the hop number of the sink node 1021 was changed to 1.

Figure 13:
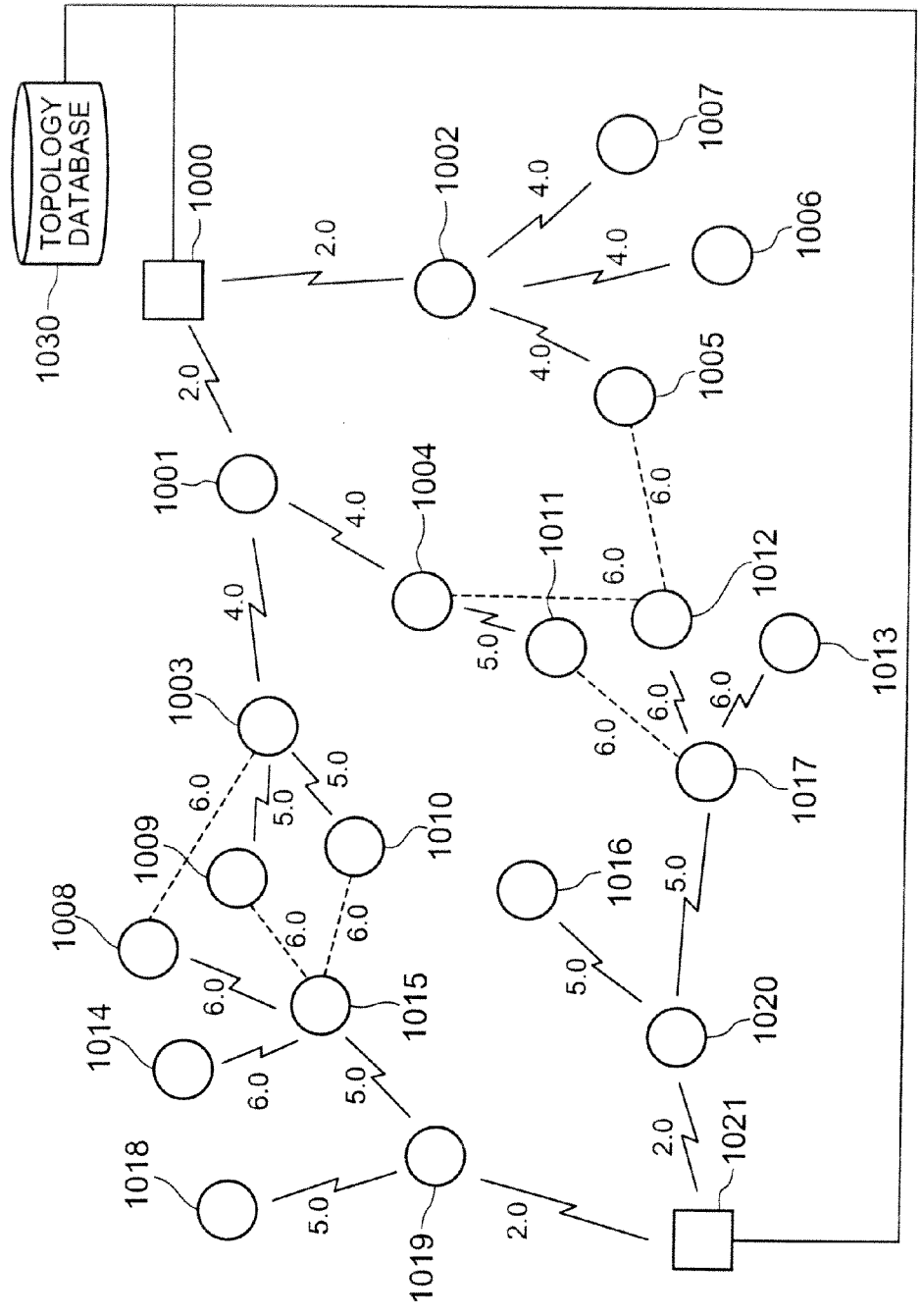
FIG. 13 shows a connectional relation after correcting the bias between the nodes of the wireless sensor network in accordance with the third exemplary embodiment of the present invention.

Referring to FIGS. 12 and 13, by changing the hop number from 0 to 1 sent by the sink node 1021, the metric values of the sensor nodes 1019 and 1021 are changed with respect to the sink node 1021. Further, because the hop number is changed from 1 to 2, sent from the sensor nodes 1019 and 1020 to the peripheral nodes, the metric values of the sensor nodes 1018 and 1015 are changed with respect to the sensor node 1019, and the metric values of the sensor nodes 1016 and 1017 are changed with respect to the sensor node 1020. Further, because the hop number is changed from 2 to 3, sent from the sensor nodes 1018, 1015, 1016 and 1017 to the peripheral nodes, the metric values of the sensor nodes 1014, 1008, 1009 and 1010 are changed with respect to the sensor node 1015, and the metric values of the sensor nodes 1011, 1012, 1013 and 1017 are changed with respect to the sensor node 1017. As a result, the sensor nodes 1009 and 1010 shift the superordinate destination node from the sensor node 1015 to the sensor node 1003 with the smaller metric value. Further, the sensor node 1011 shifts the superordinate destination node from the sensor node 1017 to the sensor node 1004 with the smaller metric value.

By the above results, the numbers of the sensor nodes attributing to the sink nodes 1000 and 1021 are equalized to be 10, respectively.

Further, if it is determined that there is bias in the topologies respectively attributing to the sink nodes 1000 and 1021 (the topologies inside the sink nodes), the equalization is carried out by the same procedure as in the second exemplary embodiment.

Further, in the third exemplary embodiment, although an example of compulsorily changing the hop number is shown, as already explained in the first exemplary embodiment, it is also possible to take other data than the hop number to be the change objects such as the child node number, the metric value, and the handicap value.

Although the present invention is explained hereinabove through a few of the exemplary embodiments, the present invention is not limited to the above exemplary embodiments only but can undergo other kinds of additional changes. Further, although the functions of the wireless nodes of the present invention are realized by hardware as a matter of course, they can also be realized by a computer and computer programs. The computer programs are recorded and provided in a computer readable recording medium such as magnetic disks, semiconductor memories, and the like, and read out by the computer when started up, etc., so as to cause the computer to function as the wireless nodes aforementioned in the respective exemplary embodiments by controlling the operation of the computer.

The present invention is applicable to environment measuring systems, automated meter reading systems, wireless sensor networks, wireless multihop networks, wireless base stations with wireless terminals, and the like.

The invention claimed is:

1. A path control method for a multihop wireless network comprising a plurality of wireless nodes, the method comprising:
    calculating a metric value indicating a quantity of providing a guideline for selecting a superordinate destination node with each candidate for the superordinate destination node when carrying out a multihop wireless communication with a specific wireless node among the plurality of wireless nodes based on peripheral node information about the node information received from peripheral wireless nodes, by each of the wireless nodes;
    determining the superordinate destination node based on the calculated metric value, by each of the wireless nodes;
    selecting, as a target wireless node, a wireless node expected to change a number of the wireless nodes existing in a subordinate hierarchy lower than its own node from a network topology of tree structure with the specific wireless node as a root and wireless nodes other than the specific wireless node as knots and leaves in the multihop wireless network; and
    changing, intentionally, a value of the node information sent from the target wireless node to the peripheral wireless nodes.

2. The path control method for a multihop wireless network according to claim 1, wherein the target wireless node comprises a wireless node with a larger number of wireless nodes existing in the subordinate hierarchy, compared with the other wireless nodes of the same hierarchy in the network topology of tree structure, and in said changing, the value of the node information is changed such that the metric value, as calculated with the target wireless node as a candidate for the superordinate destination node, may become larger in terms of a communication cost of link.

3. The path control method for multihop wireless network according to claim 1, wherein the target wireless node comprises a wireless node with a smaller number of wireless nodes existing in the subordinate hierarchy, compared with the other wireless nodes of the same hierarchy in the network topology of tree structure, and in said changing, the value of the node information is changed such that the metric value, as calculated with the target wireless node as a candidate for the superordinate destination node, may become smaller in terms of a communication cost of link.

4. The path control method for multihop wireless network according to claim 1, wherein in said changing, the value of the node information is changed to a different value from an actual value included in the node information.

5. The path control method for multihop wireless network according to claim 4, wherein the actual value is at least one of a hop number from the target wireless node to the specific wireless node, a child node number which is a number of the wireless nodes with the target wireless node being determined to be the superordinate destination node, and the metric value of the superordinate destination node calculated when determining the target wireless node to be the superordinate destination node.

6. The path control method for multihop wireless network according to claim 1, wherein in said changing, a handicap value is changed, said handicap value comprising a weighting parameter value utilized in calculating the metric value.

7. A multihop wireless network comprising:
    a plurality of wireless nodes; and
    a control node,
    wherein each of the wireless nodes comprises:
        a peripheral node information acquisition unit for sending node information about its own wireless node to peripheral wireless nodes while acquiring peripheral node information about the node information received from the peripheral wireless nodes;
        a metric calculation unit for calculating a metric value indicating a quantity of providing a guideline for selecting a superordinate destination node with each candidate for the superordinate destination node when carrying out a multihop wireless communication with a specific wireless node among the plurality of wireless nodes based on the acquired peripheral node information; and
        a superordinate destination node determination unit for determining the superordinate destination node based on the calculated metric value, and
    wherein the control node comprises:
        a network management unit for generating a network topology of tree structure with the specific wireless node as a root and wireless nodes other than the specific wireless node as knots and leaves in the multihop wireless network, selecting, as a target wireless node, the wireless node expected to change a number of the wireless nodes existing in a subordinate hierarchy lower than its own node from the generated network topology of tree structure, and changing, intentionally, a value of the node information sent from the target wireless node to the peripheral wireless nodes.

8. A wireless node connected to a multihop wireless network, the wireless node comprising:
    a peripheral node information acquisition unit for sending node information about its own wireless node to peripheral wireless nodes while acquiring peripheral node information about the node information received from the peripheral wireless nodes;
    a metric calculation unit for calculating a metric value indicating a quantity of providing a guideline for selecting a superordinate destination node with each candidate for the superordinate destination node when carrying out a multihop wireless communication with a specific wireless node among the plurality of wireless nodes based on the acquired peripheral node information;
    a superordinate destination node determination unit for determining the superordinate destination node based on the calculated metric value; and
    a network management unit for generating a network topology of tree structure with the specific wireless node as a root and wireless nodes other than the specific wireless node as knots and leaves in the multihop wireless network, selecting, as a target wireless node, the wireless node expected to change a number of the wireless nodes existing in a subordinate hierarchy lower than its own node from the generated network topology of tree structure, and changing, intentionally, a value of the node information sent from the target wireless node to the peripheral wireless nodes.

9. A non-transitory computer readable medium storing a program comprising instructions for causing a computer to function as a plurality of units, the computer comprising a wireless node connected to a multihop wireless network, the plurality of units comprising:
    a peripheral node information acquisition unit for sending node information about its own wireless node to peripheral wireless nodes while acquiring peripheral node information about the node information received from the peripheral wireless nodes;

a metric calculation unit for calculating a metric value indicating a quantity of providing a guideline for selecting a superordinate destination node with each candidate for the superordinate destination node when carrying out a multihop wireless communication with a specific wireless node among the plurality of wireless nodes based on the acquired peripheral node information;

a superordinate destination node determination unit for determining the superordinate destination node based on the calculated metric value; and a network management unit for generating a network topology of tree structure with the specific wireless node as a root and wireless nodes other than the specific wireless node as knots and leaves in the multihop wireless network, selecting, as a target wireless node, the wireless node expected to change a number of the wireless nodes existing in a subordinate hierarchy lower than its own node from the generated network topology of tree structure, and changing, intentionally, a value of the node information sent from the target wireless node to the peripheral wireless nodes.

10. The path control method for a multihop wireless network according to claim 1, wherein said superordinate destination node comprises a next hop wireless node which functions as a relay node.

11. The path control method for a multihop wireless network according to claim 1, wherein said superordinate destination node is determined autonomously.

12. The path control method for a multihop wireless network according to claim 1, wherein said peripheral node information comprises a node identifier.

13. The path control method for a multihop wireless network according to claim 1, wherein said peripheral node information comprises a reception intensity.

14. The path control method for a multihop wireless network according to claim 1, wherein said value of the node information sent from the target wireless node to the peripheral wireless nodes comprises a hop number.

15. The path control method for a multihop wireless network according to claim 1, further comprising selecting a peripheral node to the superordinate destination node with a smallest metric value of the metric values calculated for each peripheral node.

16. The path control method for a multihop wireless network according to claim 7, wherein said metric value indicates a cost for reaching said control node for collecting sensor data.

17. The path control method for a multihop wireless network according to claim 7, wherein said network management unit comprises a computation unit which derives tree topology information.

18. The path control method for a multihop wireless network according to claim 17, wherein said network management unit further comprises a topology management unit which stores said tree topology information in a network database.

19. The path control method for a multihop wireless network according to claim 17, wherein said computation unit derives said tree topology information based on routing information in packets received from a node of said plurality of wireless nodes.

20. The path control method for a multihop wireless network according to claim 17, wherein said computation unit calculates a hop number to be set to a relevant node for carrying out an equalization of node number bias in said network topology of tree structure.

* * * * *